(12) United States Patent
Ouchi et al.

(10) Patent No.: US 9,532,343 B2
(45) Date of Patent: Dec. 27, 2016

(54) RADIO COMMUNICATION SYSTEM, MOBILE STATION APPARATUS, RADIO COMMUNICATION METHOD AND INTEGRATED CIRCUIT

(71) Applicant: SHARP KABUSHIKI KAISHA, Osaka-shi, Osaka (JP)

(72) Inventors: Wataru Ouchi, Osaka (JP); Tatsushi Aiba, Osaka (JP); Daiichiro Nakashima, Osaka (JP); Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/705,808

(22) Filed: May 6, 2015

(65) Prior Publication Data
US 2015/0237620 A1   Aug. 20, 2015

Related U.S. Application Data

(63) Continuation of application No. 13/578,266, filed as application No. PCT/JP2011/050663 on Jan. 17, 2011, now Pat. No. 9,054,841.

(30) Foreign Application Priority Data

Feb. 12, 2010   (JP) ................................ 2010-028727

(51) Int. Cl.
*H04W 72/04*   (2009.01)
(52) U.S. Cl.
CPC ..... *H04W 72/0413* (2013.01); *H04W 72/0473* (2013.01)

(58) Field of Classification Search
CPC .. H04W 52/146; H04W 52/34; H04W 52/281; H04W 52/367; H04L 5/0048
See application file for complete search history.

(56) References Cited

U.S. PATENT DOCUMENTS

| 8,391,190 B2 | 3/2013 | Pan et al. |
| 2008/0233992 A1 | 9/2008 | Oteri et al. |

(Continued)

FOREIGN PATENT DOCUMENTS

| EP | 2104255 A1 | 9/2009 |
| WO | WO 2008/149979 A1 | 12/2008 |

(Continued)

OTHER PUBLICATIONS

Papasakellariou (61/160, 879) Mar. 17, 2009 "Transmission Power Control in Uplink of Multi-Carrier Communication systems".*

(Continued)

*Primary Examiner* — David Oveissi
(74) *Attorney, Agent, or Firm* — Birch, Stewart, Kolasch & Birch, LLP

(57) ABSTRACT

A mobile station apparatus that receives first information by using a radio resource control signal. The mobile station apparatus is programmed to drop a transmission of a sounding reference signal, where in a case that the first information is configured, in a case that the transmission of the sounding reference signal for a first component carrier overlaps with a transmission of a physical uplink control channel for a second component carrier, and in a case that, on the overlapped portion, total transmit power of the mobile station apparatus exceeds total maximum output power configured by the mobile station apparatus.

10 Claims, 11 Drawing Sheets

(56) References Cited

U.S. PATENT DOCUMENTS

| | | | |
|---|---|---|---|
| 2009/0274100 A1 | 11/2009 | Montojo et al. | |
| 2009/0325504 A1 | 12/2009 | Aiba et al. | |
| 2009/0325616 A1 | 12/2009 | Aiba et al. | |
| 2009/0325617 A1 | 12/2009 | Aiba et al. | |
| 2009/0325618 A1 | 12/2009 | Aiba et al. | |
| 2009/0325619 A1 | 12/2009 | Aiba et al. | |
| 2010/0098012 A1 | 4/2010 | Bala et al. | |
| 2010/0246463 A1* | 9/2010 | Papasakellariou .. | H04W 52/146 370/311 |
| 2010/0246561 A1 | 9/2010 | Shin et al. | |
| 2011/0038271 A1* | 2/2011 | Shin ................... | H04W 52/146 370/252 |
| 2011/0058505 A1 | 3/2011 | Pan et al. | |
| 2011/0188428 A1 | 8/2011 | Ishii | |

FOREIGN PATENT DOCUMENTS

| | | |
|---|---|---|
| WO | WO 2009/132591 A1 | 11/2009 |
| WO | WO 2009/137481 A2 | 11/2009 |
| WO | WO 2010/018819 A1 | 2/2010 |
| WO | WO 2010/107880 A2 | 9/2010 |

OTHER PUBLICATIONS

LG Electronics, "Basic UL power control methods in LTE-Advanced", 3GPP TSG RAN WG1 #59bis, R1-100216, Valencia, Spain, Jan. 18-22, 2010 (available online Jan. 12, 2010), p. 1-5.
Qualcomm Incorporated, "UL Power Control for Multicarrier Operation", 3GPP TSG RAN WG1 #59bis, R1-100677, Valencia, Spain, Jan. 18-22, 2010 (available online Jan. 12, 2010), p. 1-5.
Catt, "Combination of UCI transmission in LTE-A", 3GPP TSG RAN WG1 Meeting #62 R1-104318, 3GPP, Aug. 23-27, 2010.
Ericsson, "Carrier aggregation in LTE-Advanced", 3GPP TSG-RAN WG1 #53bis R1-082468, 3GPP, Jun. 30-Jul. 4, 2008.
International Search Report for PCT/JP2011/050663 dated Apr. 5, 2011.
Nokia Seimens Networks, Nokia, "Channel sounding enhancements for LTE-Advanced", 3GPP TSG RAN WG1 Meeting #59 R1-094653, 3GPP, Nov. 9-13, 2009.
Nokia Seimens Networks, Nokia, "Channel sounding enhancements for LTE-Advanced", 3GPP TSG RAN WG1 Meeting #59bis R1-100337, 3GPP, Jan. 18-22, 2010.
U.S. Notice of Allowance issued in U.S. Appl. No. 13/578,266 on Feb. 3, 2015.
U.S. Office Action issued in U.S. Appl. No. 13/578,266 on Sep. 19, 2014.
U.S. Office Action issued in U.S. Appl. No. 13/578,266 on Jun. 3, 2014.
Nokia Siemens et al., "UL Sounding Arrangement," 3GPP TSG RAN WG1 Meeting #50, R1-073642, Athens, Greece, Aug. 15, 2007, 5 pages.
Texas Instruments, "Further Details on LTE-A UL Power Control," 3GPP TSG RAN WG1 #59bis, R1-100449, Valencia, Spain, Jan. 12, 2010, 5 pages.
Zte, "Multiplexing of Sounding RS and PUCCH," 3GPP TSG-RAN WG1 #51, R1-074554, Jeju, Korea, Oct. 31, 2007, 5 pages.

* cited by examiner

FIG. 9

| SUB-FRAME | FIRST REFERENCE SIGNAL (Aperiodic SRS) | SECOND REFERENCE SIGNAL (Periodic SRS) | PHYSICAL UPLINK CONTROL CHANNEL (PUCCH) |
|---|---|---|---|
| #0 |  | ○ |  |
| #1 |  |  |  |
| #2 |  | ○ |  |
| #3 | ○ |  |  |
| #4 |  | ○ |  |
| #5 |  |  |  |
| #6 | ○ | ○ |  |
| #7 |  |  | ○ |
| #8 | ○ | ○ |  |
| #9 |  |  |  |
| #10 |  | ○ |  |
| #11 |  |  | ○ |
| #12 | ○ | ○ |  |
| #13 |  |  |  |
| #14 |  | ○ | ○ |
| #15 | ○ |  |  |
| #16 |  | ○ |  |
| #17 |  |  |  |
| #18 |  | ○ | ○ |
| #19 |  |  |  |

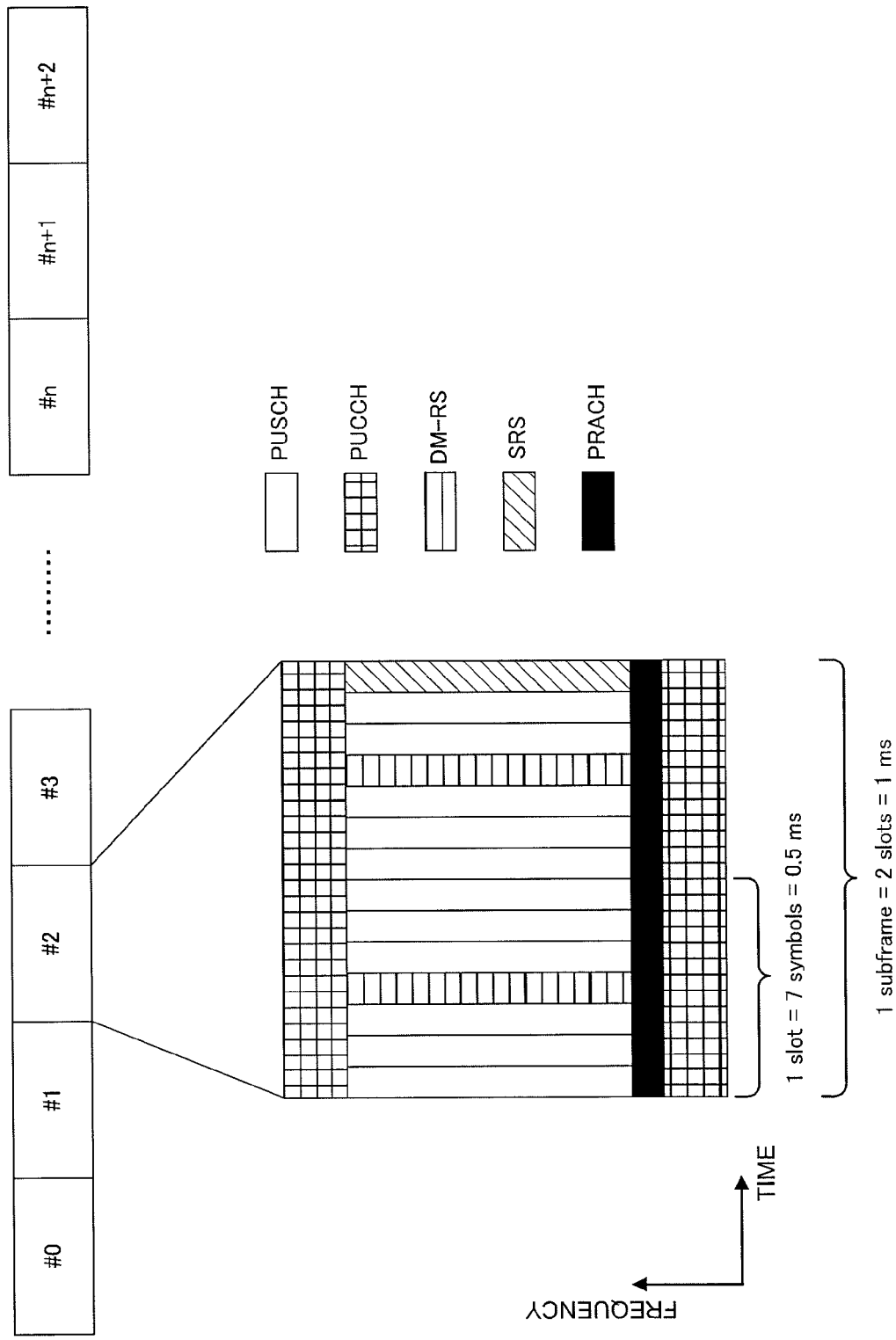

RADIO COMMUNICATION SYSTEM, MOBILE STATION APPARATUS, RADIO COMMUNICATION METHOD AND INTEGRATED CIRCUIT

This application is a Continuation of copending application Ser. No. 13/578,266, filed on Sep. 19, 2012, which was filed as PCT International Application No. PCT/JP2011/050663 on Jan. 17, 2011, which claims the benefit under 35 U.S. C. §119(a) to Patent Application No. 2010-028727, filed in Japan on Feb. 12, 2010, all of which are hereby expressly incorporated by reference into the present application.

TECHNICAL FIELD

The present invention relates to a radio communication system which is comprised of a mobile station apparatus and a base station apparatus, and in particular, relates to a transmission control method of a plurality of reference signals for channel estimation of a mobile station apparatus.

BACKGROUND ART

Conventionally, evolution of a radio access method and a radio network of a cellular mobile communication (hereinafter, referred to as "Long Term Evolution (LTE)" or "Evolved Universal Terrestrial Radio Access (EUTRA)"), and a radio access method and radio network which realize higher-speed data communication through the use of a frequency band wider than the LTE (hereinafter, referred to as "Long Term Evolution-Advanced (LTE-A)" or "Advanced Evolved Universal Terrestrial Radio Access (A-EUTRA)") have been examined in the 3rd Generation Partnership Project (3GPP).

In the LTE-A, it is requested that the LTE-A has backward compatibility with the LTE, that is, a base station apparatus of the LTE-A is made to be able to perform radio communication simultaneously With mobile station apparatuses of both the LTE-A and the LTE, and a mobile station apparatus of the LTE-A is made to be able to perform radio communication with base station apparatuses of both LTE-A and the LTE, and it has been examined that the LTE-A uses the same channel structure as the LTE. For example, in the LTE-A, a technology in which a plurality of Component Carriers (CCs) being frequency bands having the same channel structure as the LTE is used as one frequency band (wideband frequency band) (frequency band aggregation; referred to also as Spectrum aggregation, Carrier aggregation, Frequency aggregation, or the like), has been proposed (Non-patent document 1).

Furthermore, in the LTE-A, other than a reference signal for channel estimation transmitted at a periodic timing set by a base station apparatus, a reference signal for channel estimation transmitted only when a base station apparatus provides notification of a transmission request has been proposed (Non-patent document 2).

PRIOR ART DOCUMENT

Non-Patent Document

Non-patent document 1: Ericsson, R1-082468, 3GPP TSG-RAN1 Meeting #53bis, Warsaw, Poland, Jun. 30-Jul. 4, 2008

Non-patent document 2: Nokia Siemens Networks, R1-094653, 3GPPTSG-RAN1 Meeting#59, Jeju, Korea, Nov. 9-13, 2009

DISCLOSURE OF THE INVENTION

SUMMARY OF THE INVENTION

Problems to be Solved by the Invention

However, as for a transmission of a first reference signal for channel estimation, which transmission is indicated through the use of a physical downlink control channel and a transmission of a second reference signal for channel estimation, which transmission is indicated through the use of a radio resource control signal, the transmission of the first reference signal and the transmission of the second reference signal are indicated by different downlink signals (e.g. radio resource control signal and physical downlink control channel), and thus the transmission of the first reference signal and the transmission of the second reference signal may happen to coincide in the same timing, and in the case where a plurality of reference signals for channel estimation are simultaneously transmitted from one mobile station apparatus in the same timing, a channel estimation accuracy of a reference signal for channel estimation may be deteriorated. In addition, also, as for a physical uplink control channel, a transmission is indicated through the use of a radio resource control signal, and thus, when a transmission of a reference signal for channel estimation and a physical uplink control channel also happen to coincide in the same timing, a communication quality of an uplink signal may be deteriorated.

The present invention has been accomplished in view of the above-mentioned points, the object is to provide a radio communication system, a mobile station apparatus, a radio communication method and an integrated circuit which are capable of performing efficiently transmission of a first reference signal and second reference signal for channel estimation without deteriorating a channel estimation accuracy, and at the same time, which are capable of performing efficiently transmission of the first reference signal and second reference signal for channel estimation and transmission on a physical uplink control channel without deteriorating a communication quality.

Means for Solving the Problems (1) In order to achieve the above-mentioned objects, the present invention has taken the following measures. That is, a radio communication system of the present invention is a radio communication system in which a base station apparatus and a mobile station apparatus perform radio communication, wherein the base station apparatus transmits, to the mobile station apparatus, a physical downlink control channel including information indicating a transmission of a first reference signal for channel estimation and a radio resource control signal including information indicating a transmission of a second reference signal for channel estimation, and the mobile station apparatus, in the case where information indicating a transmission of the first reference signal is included in the physical downlink control channel, transmits the first reference signal to the base station apparatus, and in accordance with information indicating a transmission of the second reference signal included in the radio resource control signal, transmits the second reference signal to the base station apparatus, and in the case where a transmission of the first reference signal and a transmission of the second reference signal have happened to coincide in the same timing, performs transmission of the first reference signal, and in contrast, in the case where a transmission of the first reference signal and a transmission of the second reference signal have happened to coincide in different component carriers in the same timing, performs transmission of the first reference signal and transmission of the second reference signal simultaneously.

In this way, the mobile station apparatus, in the case where a transmission of a first reference signal and a transmission of a second reference signal have happened to coincide in the same timing, performs transmission of the first reference signal, and in contrast, in the case where a transmission of a first reference signal and a transmission of a second reference signal have happened to coincide in different component carriers in the same timing, performs transmission of the first reference signal and transmission of the second reference signal simultaneously, and thus it is possible to avoid, with simple processing, the fact that both reference signals interfere with each other and channel estimation accuracies of both reference signals deteriorate in the base station apparatus.

(2) A radio communication system of the present invention is a radio communication system in which a base station apparatus and a mobile station apparatus perform radio communication, wherein the base station apparatus transmits, to the mobile station apparatus, a radio resource control signal including information indicating a transmission on a physical uplink control channel and a physical downlink control channel including information indicating a transmission of a first reference signal for channel estimation, and the mobile station apparatus, in accordance with information indicating a transmission on the physical uplink control channel included in the radio resource control signal, transmits uplink control information to the base station apparatus by using the physical uplink control channel, and in the case where information indicating a transmission of the first reference signal is included in the physical downlink control channel, transmits the first reference signal to the base station apparatus, and in the case where a transmission of the first reference signal and a transmission of the uplink control information on the physical uplink control channel have happened to coincide in the same timing, performs transmission of the uplink control information on the physical uplink control channel.

In this way, the mobile station apparatus, in the case where a transmission of a first reference signal and a transmission of uplink control information on a physical uplink control channel have happened to coincide in the same timing, performs transmission of the uplink control information on a physical uplink control channel, and thus, can maintain a communication quality of a physical uplink control channel. In addition, the mobile station apparatus can perform efficiently transmission of a first reference signal and transmission on a physical uplink control channel.

(3) Furthermore, in the radio communication system of the present invention, the mobile station apparatus, in the case where a transmission of the first reference signal and a transmission of the uplink control information on the physical uplink control channel have happened to coincide in different component carriers in the same timing, performs transmission of the first reference signal and transmission of the uplink control information on the physical uplink control channel simultaneously.

In this way, the mobile station apparatus performs transmission of the first reference signal and transmission of the uplink control information on the physical uplink control channel simultaneously, and thus, can perform efficiently transmission of a first reference signal and transmission on a physical uplink control channel.

(4) In the radio communication system of the present invention, the mobile station apparatus, in the case where a transmission of the first reference signal and a transmission of the uplink control information on the physical uplink control channel have happened to coincide in the same component carrier in the same timing, performs transmission of the uplink control information on the physical uplink control channel, and in contrast, in the case where a transmission of the first reference signal and a transmission of the uplink control information on the physical uplink control channel have happened to coincide in different component carriers in the same timing, performs transmission of the first reference signal and transmission of the uplink control information on the physical uplink control channel simultaneously.

In this way, the mobile station apparatus, in the case where a transmission of a first reference signal and a transmission of uplink control information on a physical uplink control channel have happened to coincide in the same component carrier in the same timing, performs transmission of the uplink control information on the physical uplink control channel, and in contrast, in the case where a transmission of a first reference signal and a transmission of uplink control information on a physical uplink control channel have happened to coincide in different component carriers in the same timing, performs transmission of the first reference signal and transmission of the uplink control information on the physical uplink control channel simultaneously, and thus, can perform efficiently transmission of a first reference signal and transmission on a physical uplink control channel.

(5) A radio communication system of the present invention is a radio communication system in which a base station apparatus and a mobile station apparatus perform radio communication, wherein the base station apparatus transmits, to the mobile station apparatus, a physical downlink control channel including information indicating a transmission of a first reference signal for channel estimation, a radio resource control signal including information indicating a transmission of a second reference signal for channel estimation, and a radio resource control signal including information indicating a transmission on a physical uplink control channel, and the mobile station apparatus, in the case where information indicating a transmission of the first reference signal is included in the physical downlink control channel, transmits the first reference signal to the base station apparatus, and in accordance with information indicating a transmission of the second reference signal included in the radio resource control signal, transmits the second reference signal to the base station apparatus, and in accordance with information indicating a transmission on the physical uplink control channel included in the radio resource control signal, transmits uplink control information to the base station apparatus by using the physical uplink control channel, and in the case where a transmission of the first reference signal, a transmission of the second reference signal and a transmission on the physical uplink control channel have happened to coincide in the same timing, performs transmission of the uplink control information on the physical uplink control channel.

In this way, the mobile station apparatus, in the case where a transmission of a first reference signal, a transmission of a second reference signal and a transmission on a physical uplink control channel have happened to coincide in the same timing, performs transmission on the physical uplink control channel, and thus, can maintain a communication quality of a physical uplink control channel by giving top priority to a transmission on a physical uplink control channel. In addition, it is possible to perform efficiently transmission of a first reference signal, transmission of a second reference signal and transmission on a physical uplink control channel.

(6) In the radio communication system of the present invention, the mobile station apparatus, in the case where a transmission of the first reference signal, a transmission of the second reference signal and a transmission on the physical uplink control channel have happened to coincide in different component carriers in the same timing, performs transmission of the first reference signal, transmission of the second reference signal and transmission of the uplink control information on the physical uplink control channel simultaneously.

In this way, the mobile station apparatus, in the case where a transmission of a first reference signal, a transmission of a second reference signal and a transmission on a physical uplink control channel have happened to coincide in different component carriers in the same timing, performs transmission of the first reference signal, transmission of the second reference signal and transmission of the uplink control information on the physical uplink control channel simultaneously, and thus, it is possible to perform efficiently transmission of a first reference signal, transmission of a second reference signal and transmission on a physical uplink control channel.

(7) In the radio communication system of the present invention, the mobile station apparatus, in the case where a transmission of the first reference signal, a transmission of the second reference signal and a transmission on the physical uplink control channel have happened to coincide in the same component carrier in the same timing, performs transmission of the uplink control information on the physical uplink control channel, and in contrast, in the case where a transmission of the first reference signal, a transmission of the second reference signal and a transmission on the physical uplink control channel have happened to coincide in different component carriers in the same timing, performs transmission of the first reference signal, transmission of the second reference signal and transmission on the physical uplink control channel simultaneously.

In this way, the mobile station apparatus, in the case where a transmission of a first reference signal, a transmission of a second reference signal and a transmission on a physical uplink control channel have happened to coincide in the same component carrier in the same timing, performs transmission of the uplink control information on the physical uplink control channel, and in contrast, in the case where a transmission of a first reference signal, a transmission of a second reference signal and a transmission on a physical uplink control channel have happened to coincide in different component carriers in the same timing, performs simultaneously transmission of the first reference signal, transmission of the second reference signal and transmission on the physical uplink control channel. Thereby, it is possible to perform efficiently transmission of a first reference signal, transmission of a second reference signal and transmission on a physical uplink control channel.

(8) A radio communication system of the present invention is a radio communication system in which a base station apparatus and a mobile station apparatus perform radio communication, wherein the base station apparatus transmits, to the mobile station apparatus, a physical downlink control channel including information indicating a transmission of a first reference signal for channel estimation, a radio resource control signal including information indicating a transmission of a second reference signal for channel estimation, and a signal including information allowing a simultaneous transmission by a plurality of channels, and the mobile station apparatus, in the case where information indicating a transmission of the first reference signal is included in the physical downlink control channel, transmits the first reference signal to the base station apparatus, and in accordance with information indicating a transmission of the second reference signal included in the radio resource control signal, transmits the second reference signal to the base station apparatus, and in accordance with information allowing the simultaneous transmission, in the case where a transmission of the first reference signal and a transmission of the second reference signal have been allocated by using the same radio resources in the same timing, performs transmission of the first reference signal.

In this way, the mobile station apparatus, in accordance with information allowing simultaneous transmission, in the case where a transmission of a first reference signal and a transmission of a second reference signal have been allocated by using the same radio resources in the same timing, performs transmission of the first reference signal, and thus, can perform transmission of the reference signal for channel estimation and transmission on the physical uplink control channel efficiently in a short time.

(9) A radio communication system of the present invention is a radio communication system in which a base station apparatus and a mobile station apparatus perform radio communication, wherein the base station apparatus transmits, to the mobile station apparatus, a radio resource control signal including information indicating a transmission on a physical uplink control channel, a physical downlink control channel including information indicating a transmission of a first reference signal for channel estimation and a signal including information allowing a simultaneous transmission by a plurality of channels, and the mobile station apparatus, in accordance with information indicating a transmission on the physical uplink control channel included in the radio resource control signal, transmits uplink control information to the base station apparatus by using the physical uplink control channel, and in the case where information indicating a transmission of the first reference signal is included in the physical downlink control channel, transmits the first reference signal to the base station apparatus, and in accordance with information allowing the simultaneous transmission, in the case where a transmission of the first reference signal and a transmission on the physical uplink control channel have happened to coincide in the same timing, performs transmission of the first reference signal and transmission of the uplink control information on the physical uplink control channel simultaneously.

In this way, the mobile station apparatus, in accordance with information allowing a simultaneous transmission, in the case where a transmission of a first reference signal and a transmission on a physical uplink control channel have happened to coincide in the same timing, performs transmission of the first reference signal and transmission of the uplink control information on the physical uplink control channel simultaneously, and thus, can perform transmission of a reference signal for channel estimation and transmission on a physical uplink control channel efficiently in a short time.

(10) Furthermore, a radio communication system of the present invention is a radio communication system in which a base station apparatus and a mobile station apparatus perform radio communication, wherein the base station apparatus transmits, to the mobile station apparatus, a physical downlink control channel including information indicating a transmission of a first reference signal for channel estimation, a radio resource control signal including information indicating a transmission of a second reference signal for channel estimation, a radio resource control signal including information indicating a transmission on a physical uplink control channel, and a signal including information allowing a simultaneous transmission by a plurality of channels, and the mobile station apparatus, in the case where information indicating a transmission of the first reference signal is included in the physical downlink control channel, transmits the first reference signal to the base station apparatus, and in accordance with information indicating a transmission of the second reference signal included in the radio resource control signal, transmits the second reference signal to the base station apparatus, and in accordance with information indicating a transmission on the physical uplink control channel included in the radio resource control signal, transmits uplink control information to the base station apparatus by using the physical uplink control channel, and in accordance with information allowing the simultaneous transmission, in the case where a transmission of the first reference signal, a transmission of the second reference signal and a transmission of the uplink control information on the physical uplink control channel have happened to coincide in the same timing, and in the case where the first reference signal and the second reference signal have been allocated by using the same radio resources, performs transmission of the first reference signal and the uplink control information on the physical uplink control channel.

In this way, the mobile station apparatus, in accordance with information allowing simultaneous transmission, in the case where a transmission of a first reference signal, a transmission of a second reference signal and a transmission of uplink control information on a physical uplink control channel have happened to coincide in the same timing, and a first reference signal and a second reference signal have been allocated by using the same radio resources, performs transmission of the first reference signal and the uplink control information on the physical uplink control channel. Thereby, the mobile station apparatus can perform transmission of a reference signal for channel estimation and transmission on a physical uplink control channel efficiently in a short time.

(11) Moreover, the mobile station apparatus of the present invention is a mobile station apparatus which performs radio communication with a base station apparatus, wherein the mobile station apparatus, in the case where information indicating a transmission of a first reference signal for channel estimation is included in a physical downlink control channel received from the base station apparatus, transmits the first reference signal to the base station apparatus, and in accordance with information indicating a transmission of a second reference signal for channel estimation included in a radio resource control signal received from the base station apparatus, transmits the second reference signal to the base station apparatus, and in the case where a transmission of the first reference signal and a transmission of the second reference signal have happened to coincide in the same timing, performs transmission of the first reference signal, and in contrast, in the case where a transmission of the first reference signal and a transmission of the second reference signal have happened to coincide in different component carriers in the same timing, performs transmission of the first reference signal and transmission of the second reference signal simultaneously.

In this way, the mobile station apparatus, in the case where a transmission of a first reference signal and a transmission of a second reference signal have happened to coincide in the same timing, performs transmission of a first reference signal, and in contrast, in the case where a transmission of a first reference signal and a transmission of a second reference signal have happened to coincide in different component carriers in the same timing, performs transmission of a first reference signal and transmission of a second reference signal simultaneously, and thus it is possible to avoid, with simple processing, the fact that both reference signals interfere with each other and channel estimation accuracies of both reference signals deteriorate in the base station apparatus.

(12) Moreover, the mobile station apparatus of the present invention is a mobile station apparatus which performs radio communication with a base station apparatus, wherein the mobile station apparatus, in accordance with information indicating a transmission on a physical uplink control channel included in a radio resource control signal received from the base station apparatus, transmits uplink control information to the base station apparatus by using the physical uplink control channel, and in the case where information indicating a transmission of a first reference signal for channel estimation is included in a physical downlink control channel received from the base station apparatus, transmits the first reference signal to the base station apparatus, and in the case where a transmission of the first reference signal and a transmission of the uplink control information on the physical uplink control channel have happened to coincide in the same timing, performs transmission of the uplink control information on the physical uplink control channel.

In this way, the mobile station apparatus, in the case where a transmission of a first reference signal and a transmission of uplink control information on a physical uplink control channel have happened to coincide in the same timing, performs transmission of the uplink control information on the physical uplink control channel, and thus, can maintain a communication quality of a physical uplink control channel. In addition, the mobile station apparatus can perform efficiently transmission of a first reference signal and transmission on a physical uplink control channel.

(13) Furthermore, in a mobile station apparatus of the present invention, the mobile station apparatus, in the case where a transmission of the first reference signal and a transmission of the uplink control information on the physical uplink control channel have happened to coincide in different component carriers in the same timing, performs transmission of the first reference signal and transmission of the uplink control information on the physical uplink control channel simultaneously.

In this way, the mobile station apparatus, in the case where a transmission of a first reference signal and a transmission of uplink control information on a physical uplink control channel have happened to coincide in different component carriers in the same timing, performs transmission of the first reference signal and transmission of the uplink control information on the physical uplink control channel simultaneously, and thus, can perform efficiently transmission of a first reference signal and transmission on a physical uplink control channel.

(14) In addition, the mobile station apparatus of the present invention, the mobile station apparatus, in the case where a transmission of the first reference signal and a transmission of the uplink control information on the physical uplink control channel have happened to coincide in the same component carrier in the same timing, performs transmission of the uplink control information on the physical uplink control channel, and in contrast, in the case where a transmission of the first reference signal and a transmission of the uplink control information on the physical uplink control channel have happened to coincide in different component carriers in the same timing, performs transmission of the first reference signal and transmission of the uplink control information on the physical uplink control channel simultaneously.

In this way, the mobile station apparatus, in the case where a transmission of a first reference signal and a transmission of uplink control information on a physical uplink control channel have happened to coincide in the same component carrier in the same timing, performs transmission of the uplink control information on the physical uplink control channel, and in contrast, in the case where a transmission of a first reference signal and a transmission of uplink control information on a physical uplink control channel have happened to coincide in different component carriers in the same timing, performs transmission of the first reference signal and transmission of the uplink control information on the physical uplink control channel simultaneously. Thereby, it is possible to perform efficiently transmission of a first reference signal and transmission on a physical uplink control channel.

(15) Moreover, the mobile station apparatus of the present invention is a mobile station apparatus which performs radio communication with a base station apparatus, wherein the mobile station apparatus, in the case where information indicating a transmission of a first reference signal for channel estimation is included in a physical downlink control channel received from the base station apparatus, transmits the first reference signal to the base station apparatus, and in accordance with information indicating a transmission of a second reference signal for channel estimation included in a radio resource control signal received from the base station apparatus, transmits the second reference signal to the base station apparatus, and in accordance with information indicating a transmission on a physical uplink control channel included in a radio resource control signal received from the base station apparatus, transmits uplink control information to the base station apparatus by using the physical uplink control channel, and in the case where a transmission of the first reference signal, a transmission of the second reference signal and a transmission of the uplink control information on the physical uplink control channel have happened to coincide in the same timing, performs transmission of the uplink control information on the physical uplink control channel.

In this way, the mobile station apparatus, in the case where a transmission of a first reference signal, a transmission of a second reference signal and a transmission of uplink control information on a physical uplink control channel have happened to coincide in the same timing, performs transmission on the physical uplink control channel, and thus, can maintain a communication quality of a physical uplink control channel by giving top priority to a transmission on the physical uplink control channel. In addition, it is possible to perform efficiently transmission of a first reference signal, transmission of a second reference signal and transmission on a physical uplink control channel.

(16) Moreover, in the mobile station apparatus of the present invention, in the case where a transmission of the first reference signal, a transmission of the second reference signal and a transmission of the uplink control information on the physical uplink control channel have happened to coincide in different component carriers in the same timing, performs transmission of the first reference signal, transmission of the second reference signal and transmission of the uplink control information on the physical uplink control channel simultaneously.

In this way, the mobile station apparatus, in the case where a transmission of a first reference signal, a transmission of a second reference signal and a transmission of uplink control information on a physical uplink control channel have happened to coincide in different component carriers in the same timing, performs transmission of the first reference signal, transmission of the second reference signal and transmission of the uplink control information on the physical uplink control channel simultaneously, and thus it is possible to perform efficiently transmission of a first reference signal, transmission of a second reference signal and transmission on a physical uplink control channel.

(17) Furthermore, in a mobile station apparatus of the present invention, the mobile station apparatus, in the case where a transmission of the first reference signal, a transmission of the second reference signal and a transmission of the uplink control information on the physical uplink control channel have happened to coincide in the same component carrier in the same timing, performs transmission of the uplink control information on the physical uplink control channel, and in contrast, in the case where a transmission of the first reference signal, a transmission of the second reference signal and a transmission of the uplink control information on the physical uplink control channel have happened to coincide in different component carriers in the same timing, performs transmission of the first reference signal, transmission of the second reference signal and transmission of the uplink control information on the physical uplink control channel simultaneously.

In this way, the mobile station apparatus, in the case where a transmission of a first reference signal, a transmission of a second reference signal and a transmission of uplink control information on a physical uplink control channel have happened to coincide in the same component carrier in the same timing, performs transmission of the uplink control information on the physical uplink control channel, and in contrast, in the case where a transmission of a first reference signal, a transmission of a second reference signal and a transmission of uplink control information on a physical uplink control channel have happened to coincide in different component carriers in the same timing, performs transmission of the first reference signal, transmission of the second reference signal and transmission of the uplink control information on the physical uplink control channel simultaneously. Thereby, it is possible to perform efficiently transmission of a first reference signal, transmission of a second reference signal and transmission on a physical uplink control channel.

(18) In addition, the mobile station apparatus of the present invention is a mobile station apparatus which performs radio communication with a base station apparatus, wherein the mobile station apparatus, in the case where information indicating a transmission of a first reference signal for channel estimation is included in a physical downlink control channel received from the base station apparatus, transmits the first reference signal to the base station apparatus, and in accordance with information indicating a transmission of a second reference signal for channel estimation included in a radio resource control signal received from the base station apparatus, transmits the second reference signal to the base station apparatus, and in accordance with information allowing a simultaneous transmission by a plurality of channels received from the base station apparatus, in the case where a transmission of the first reference signal and a transmission of the second reference signal have happened to coincide in the same timing and the first reference signal and the second reference signal have been allocated by using the same radio resources, transmits the first reference signal.

In this way, the mobile station apparatus, in accordance with information allowing a simultaneous transmission by a plurality of channels received from the base station apparatus, in the case where a transmission of a first reference signal and a transmission of a second reference signal have happened to coincide in the same timing, and a first reference signal and a second reference signal have been allocated by using the same radio resources, transmits the first reference signal, and thus, can perform transmission of a reference signal for channel estimation and transmission on a physical uplink control channel efficiently in a short time.

(19) Moreover, the mobile station apparatus of the present invention is a mobile station apparatus which performs radio communication with a base station apparatus, wherein the mobile station apparatus, in accordance with information indicating a transmission on a physical uplink control channel included in a radio resource control signal received from the base station apparatus, transmit uplink control information to the base station apparatus by using the physical uplink control channel, and in the case where information indicating a transmission of a first reference signal for channel estimation is included in a physical downlink control channel received from the base station apparatus, transmits the first reference signal to the base station apparatus, and in accordance with information allowing a simultaneous transmission by a plurality of channels received from the base station apparatus, in the case where a transmission of the first reference signal and a transmission of the uplink control information on the physical uplink control channel have happened to coincide in the same timing, performs transmission of the first reference signal and transmission of the uplink control information on the physical uplink control channel simultaneously.

In this way, the mobile station apparatus, in accordance with information allowing a simultaneous transmission by a plurality of channels received from the base station apparatus, in the case where a transmission of a first reference signal and a transmission of uplink control information on a physical uplink control channel have happened to coincide in the same timing, performs transmission of the first reference signal and transmission of the uplink control information on the physical uplink control channel simultaneously, and thus, can perform efficiently transmission of a first reference signal and transmission on a physical uplink control channel.

(20) Furthermore, the mobile station apparatus of the present invention is the mobile station apparatus which performs radio communication with a base station apparatus, wherein the mobile station apparatus, in the case where information indicating a transmission of a first reference signal for channel estimation is included in a physical downlink control channel received from the base station apparatus, transmits the first reference signal to the base station apparatus, and in accordance with information indicating a transmission of a second reference signal for channel estimation included in a radio resource control signal received from the base station apparatus, transmits the second reference signal to the base station apparatus, and in accordance with information indicating a transmission on a physical uplink control channel included in a radio resource control signal received from the base station apparatus, transmits uplink control information to the base station apparatus by using the physical uplink control channel, and in accordance with information allowing a simultaneous transmission by a plurality of channels received from the base station apparatus, in the case where a transmission of the first reference signal and a transmission of the second reference signal have happened to coincide in the same timing and the first reference signal and the second reference signal have been allocated by using the same radio resources, performs transmission of the first reference signal and transmission of the uplink control information on the physical uplink control channel simultaneously.

In this way, the mobile station apparatus, in accordance with information allowing a simultaneous transmission by a plurality of channels received from the base station apparatus, in the case where a transmission of a first reference signal and a transmission of a second reference signal have happened to coincide in the same timing, and a first reference signal and a second reference signal have been allocated by using the same radio resources, performs transmission of the first reference signal and transmission of the uplink control information on the physical uplink control channel simultaneously. Thereby, the mobile station apparatus can perform transmission of a reference signal for channel estimation and transmission on a physical uplink control channel efficiently in a short time.

(21) Moreover, a radio communication method of the present invention is a radio communication method by which a base station apparatus and a mobile station apparatus perform radio communication, and the radio communication method comprises at least the steps of: in the base station apparatus, transmitting a physical downlink control channel including information indicating a transmission of a first reference signal for channel estimation to the mobile station apparatus; transmitting a radio resource control signal including information indicating a transmission of a second reference signal for channel estimation to the mobile station apparatus; in the mobile station apparatus, transmitting the first reference signal to the base station apparatus in the case where information indicating a transmission of the first reference signal is included in the physical downlink control channel; transmitting the second reference signal to the base station apparatus in accordance with information indicating a transmission of the second reference signal included in the radio resource control signal; performing transmission of the first reference signal in the case where a transmission of the first reference signal and a transmission of the second reference signal have happened to coincide in the same timing; and performing transmission of the first reference signal and transmission of the second reference signal simultaneously in the case where a transmission of the first reference signal and a transmission of the second reference signal have happened to coincide in different component carriers in the same timing.

In this way, the mobile station apparatus, in the case where a transmission of a first reference signal and a transmission of a second reference signal have happened to coincide in different component carriers in the same timing, performs transmission of the first reference signal and transmission of the second reference signal simultaneously, and thus it is possible to avoid, with simple processing, the fact that both reference signals interfere with each other and channel estimation accuracies of both reference signals deteriorate in the base station apparatus.

(22) In addition, a radio communication method of the present invention is a radio communication method by which a base station apparatus and a mobile station apparatus perform radio communication, and the radio communication method comprises at least the steps of: in the base station apparatus, transmitting a radio resource control signal including information indicating a transmission on a physical uplink control channel to the mobile station apparatus; transmitting a physical downlink control channel including information indicating a transmission of a first reference signal for channel estimation to the mobile station apparatus; in the mobile station apparatus, transmitting uplink control information to the base station apparatus by using the physical uplink control channel in accordance with information indicating a transmission on the physical uplink control channel included in the radio resource control signal; transmitting the first reference signal to the base station apparatus in the case where information indicating a transmission of the first reference signal is included in the physical downlink control channel; and performing transmission of the uplink control information on the physical uplink control channel in the case where a transmission of the first reference signal and a transmission of the uplink control information on the physical uplink control channel have happened to coincide in the same timing.

In this way, the mobile station apparatus, in the case where a transmission of a first reference signal and a transmission of uplink control information on a physical uplink control channel have happened to coincide in the same timing, performs transmission of the uplink control information on the physical uplink control channel, and thus, can maintain a communication quality of a physical uplink control channel, and in addition, can perform efficiently transmission of a first reference signal and transmission on a physical uplink control channel.

(23) Furthermore, in a radio communication method of the present invention, in the mobile station apparatus, in the case where a transmission of the first reference signal and a transmission of the uplink control information on the physical uplink control channel have happened to coincide in different component carriers in the same timing, included is a step of performing transmission of the first reference signal and transmission of the uplink control information on the physical uplink control channel simultaneously.

In this way, the mobile station apparatus, in the case where a transmission of a first reference signal and a transmission of uplink control information on a physical uplink control channel have happened to coincide in different component carriers in the same timing, performs transmission of the first reference signal and transmission of the uplink control information on the physical uplink control channel simultaneously, and thus, can perform efficiently transmission of a first reference signal and transmission on a physical uplink control channel.

(24) Moreover, in a radio communication method of the present invention, in the mobile station apparatus, included is a step of performing transmission of the uplink control information on the physical uplink control channel in the case where a transmission of the first reference signal and a transmission of the uplink control information on the physical uplink control channel have happened to coincide in the same component carrier in the same timing, and in contrast, included is a step of performing transmission of the first reference signal and transmission of the uplink control information on the physical uplink control channel simultaneously in the case where a transmission of the first reference signal and a transmission of the uplink control information on the physical uplink control channel have happened to coincide in different component carriers in the same timing.

In this way, in the mobile station apparatus, in the case where a transmission of a first reference signal and a transmission of uplink control information on a physical uplink control channel have happened to coincide in the same component carrier in the same timing, transmission of the uplink control information on the physical uplink control channel is performed, and in contrast, in the case where a transmission of a first reference signal and a transmission of uplink control information on a physical uplink control channel have happened to coincide in different component carriers in the same timing, transmission of the first reference signal and transmission of the uplink control information on a physical uplink control channel are performed simultaneously. Thereby, transmission of a first reference signal and transmission on a physical uplink control channel can be performed efficiently.

(25) Furthermore, a radio communication method of the present invention is a radio communication method by which a base station apparatus and a mobile station apparatus perform radio communication, and the radio communication method comprises at least the steps of: in the base station apparatus, transmitting a physical downlink control channel including information indicating a transmission of a first reference signal for channel estimation to the mobile station apparatus; transmitting a radio resource control signal including information indicating a transmission of a second reference signal for channel estimation to the mobile station apparatus; transmitting a radio resource control signal including information indicating a transmission on a physical uplink control channel to the mobile station apparatus; in the mobile station apparatus, transmitting the first reference signal to the base station apparatus in the case where information indicating a transmission of the first reference signal is included in the physical downlink control channel; transmitting the second reference signal to the base station apparatus in accordance with information indicating a transmission of the second reference signal included in the radio resource control signal; transmitting uplink control information to the base station apparatus by using the physical uplink control channel in accordance with information indicating a transmission on the physical uplink control channel included in the radio resource control signal; and performing transmission of the uplink control information on the physical uplink control channel in the case where a transmission of the first reference signal, a transmission of the second reference signal and a transmission on the physical uplink control channel have happened to coincide in the same timing.

In this way, the mobile station apparatus, in the case where a transmission of a first reference signal, a transmission of a second reference signal and a transmission on a physical uplink control channel have happened to coincide in the same timing, performs transmission on the physical uplink control channel, and thus, can maintain a communication quality of the physical uplink control channel by giving top priority to the transmission on the physical uplink control channel. In addition, it is possible to perform efficiently transmission of a first reference signal, transmission of a second reference signal and transmission on a physical uplink control channel.

(26) In addition, in a radio communication method of the present invention, in the mobile station apparatus, included is a step of performing transmission of the first reference signal, transmission of the second reference signal and transmission of the uplink control information on the physical uplink control channel simultaneously in the case where a transmission of the first reference signal, a transmission of the second reference signal and a transmission on the physical uplink control channel have happened to coincide in different component carriers in the same timing.

In this way, in the mobile station apparatus, in the case where a transmission of a first reference signal, a transmission of a second reference signal and a transmission on a physical uplink control channel have happened to coincide in different component carriers in the same timing, transmission of the first reference signal, transmission of the second reference signal and transmission of the uplink control information on the physical uplink control channel are performed simultaneously, and thus, it is possible to perform efficiently transmission of a first reference signal, transmission of a second reference signal and transmission on a physical uplink control channel.

(27) Furthermore, in a radio communication method of the present invention, in the mobile station apparatus, there is included a step of performing transmission of the uplink control information on the physical uplink control channel in the case where a transmission of the first reference signal, a transmission of the second reference signal and a transmission on the physical uplink control channel have happened to coincide in the same component carrier in the same timing, and in contrast, there is included a step of performing transmission of the first reference signal, transmission of the second reference signal and transmission on the physical uplink control channel simultaneously in the case where a transmission of the first reference signal, a transmission of the second reference signal and a transmission on the physical uplink control channel have happened to coincide in different component carriers in the same timing.

In this way, in the mobile station apparatus, in the case where a transmission of a first reference signal, a transmission of a second reference signal and a transmission on a physical uplink control channel have happened to coincide in the same component carrier in the same timing, transmission of the uplink control information on the physical uplink control channel is performed, and in contrast, in the case where a transmission of a first reference signal, a transmission of a second reference signal and a transmission on a physical uplink control channel have happened to coincide in different component carriers in the same timing, transmission of the first reference signal, transmission of the second reference signal and transmission on the physical uplink control channel are performed simultaneously. Thereby, it is possible to perform efficiently transmission of a first reference signal, transmission of a second reference signal and transmission on a physical uplink control channel.

(28) Moreover, a radio communication method of the present invention is a radio communication method by which a base station apparatus and a mobile station apparatus perform radio communication, and the radio communication method comprises at least the steps of: in the base station apparatus, transmitting a physical downlink control channel including information indicating a transmission of a first reference signal for channel estimation to the mobile station apparatus; transmitting a radio resource control signal including information indicating a transmission of a second reference signal for channel estimation to the mobile station apparatus; transmitting a signal including information allowing a simultaneous transmission by a plurality of channels to the mobile station apparatus; in the mobile station apparatus, transmitting the first reference signal to the base station apparatus in the case where information indicating a transmission of the first reference signal is included in the physical downlink control channel; transmitting the second reference signal to the base station apparatus in accordance with information indicating a transmission of the second reference signal included in the radio resource control signal; and performing transmission of the first reference signal in accordance with information allowing the simultaneous transmission, in the case where a transmission of the first reference signal and a transmission of the second reference signal have been allocated by using the same radio resources in the same timing.

In this way, the mobile station apparatus, in accordance with information allowing simultaneous transmission, in the case where a transmission of a first reference signal and a transmission of a second reference signal have been allocated by using the same radio resources in the same timing, performs transmission of the first reference signal, and thus, can perform transmission of a reference signal for channel estimation and transmission on a physical uplink control channel efficiently in a short time.

(29) In addition, a radio communication method of the present invention is a radio communication method by which a base station apparatus and a mobile station apparatus perform radio communication, and the radio communication method comprises at least the steps of: in the base station apparatus, transmitting a radio resource control signal including information indicating a transmission on a physical uplink control channel to the mobile station apparatus; transmitting a physical downlink control channel including information indicating a transmission of a first reference signal for channel estimation to the mobile station apparatus; transmitting a signal including information allowing a simultaneous transmission by a plurality of channels to the mobile station apparatus; in the mobile station apparatus, transmitting uplink control information to the base station apparatus by using the physical uplink control channel in accordance with information indicating a transmission on the physical uplink control channel included in the radio resource control signal; transmitting the first reference signal to the base station apparatus in the case where information indicating a transmission of the first reference signal is included in the physical downlink control channel; and performing transmission of the first reference signal and transmission of the uplink control information on the physical uplink control channel simultaneously in accordance with information allowing the simultaneous transmission, in the case where a transmission of the first reference signal and a transmission on the physical uplink control channel have happened to coincide in the same timing.

In this way, the mobile station apparatus, in accordance with information allowing a simultaneous transmission, in the case where a transmission of a first reference signal and a transmission on a physical uplink control channel have happened to coincide in the same timing, performs transmission of the first reference signal and transmission of the uplink control information on the physical uplink control channel simultaneously, and thus, can perform transmission of a reference signal for channel estimation and transmission on a physical uplink control channel efficiently in a short time.

(30) Furthermore, a radio communication method of the present invention is a radio communication method by which a base station apparatus and a mobile station apparatus perform radio communication, and the radio communication method comprises at least the steps of: in the base station apparatus, transmitting a physical downlink control channel including information indicating a transmission of a first reference signal for channel estimation to the mobile station apparatus; transmitting a radio resource control signal including information indicating a transmission of a second reference signal for channel estimation to the mobile station apparatus; transmitting a radio resource control signal including information indicating a transmission on a physical uplink control channel to the mobile station apparatus; transmitting a signal including information allowing a simultaneous transmission by a plurality of channels to the mobile station apparatus; in the mobile station apparatus, transmitting the first reference signal to the base station apparatus in the case where information indicating a transmission of the first reference signal is included in the physical downlink control channel; transmitting the second reference signal to the base station apparatus in accordance with information indicating a transmission of the second reference signal included in the radio resource control signal; transmitting uplink control information to the base station apparatus by using the physical uplink control channel in accordance with information indicating a transmission on the physical uplink control channel included in the radio resource control signal; and performing transmission of the first reference signal and the uplink control information on the physical uplink control channel, in accordance with information allowing the simultaneous transmission, in the case where a transmission of the first reference signal, a transmission of the second reference signal and a transmission of the uplink control information on the physical uplink control channel have happened to coincide in the same timing, and where the first reference signal and the second reference signal have been allocated by using the same radio resources.

In this way, the mobile station apparatus, in accordance with information allowing simultaneous transmission, in the case where a transmission of a first reference signal, a transmission of a second reference signal and a transmission of uplink control information on a physical uplink control channel have happened to coincide in the same timing, and a first reference signal and a second reference signal have been allocated by using the same radio resources, performs transmission of the first reference signal and transmission of the uplink control information on a physical uplink control channel. Thereby, the mobile station apparatus can perform transmission of a reference signal for channel estimation and transmission on a physical uplink control channel efficiently in a short time.

(31) Moreover, an integrated circuit of the present invention is an integrated circuit which causes a mobile station apparatus to exert a plurality of functions by being implemented in the mobile station apparatus, and the integrated circuit includes the functions of: transmitting a first reference signal to a base station apparatus in the case where information indicating a transmission of the first reference signal for channel estimation is included in a physical downlink control channel received from the base station apparatus; transmitting a second reference signal to the base station apparatus in accordance with information indicating a transmission of the second reference signal for channel estimation included in a radio resource control signal received from the base station apparatus; performing transmission of the first reference signal in the case where a transmission of the first reference signal and a transmission of the second reference signal have happened to coincide in the same timing, and in contrast, performing transmission of the first reference signal and transmission of the second reference signal simultaneously in the case where a transmission of the first reference signal and a transmission of the second reference signal have happened to coincide in different component carriers in the same timing.

In this way, the mobile station apparatus, in the case where a transmission of a first reference signal and a transmission of a second reference signal have happened to coincide in the same timing, performs transmission of a first reference signal, and in contrast, in the case where a transmission of a first reference signal and a transmission of a second reference signal have happened to coincide in different component carriers in the same timing, performs transmission of a first reference signal and transmission of a second reference signal simultaneously, and thus it is possible to avoid, with simple processing, the fact that both reference signals interfere with each other and channel estimation accuracies of both reference signals deteriorate in the base station apparatus.

(32) In addition, an integrated circuit of the present invention is an integrated circuit which causes a mobile station apparatus to exert a plurality of functions by being implemented in the mobile station apparatus, and the integrated circuit includes the functions of: transmitting uplink control information to a base station apparatus by using a physical uplink control channel in accordance with information indicating a transmission on the physical uplink control channel included in a radio resource control signal received from the base station apparatus; transmitting a first reference signal to the base station apparatus in the case where information indicating a transmission of the first reference signal for channel estimation is included in a physical downlink control channel received from the base station apparatus; and performing transmission of the uplink control information on the physical uplink control channel in the case where a transmission of the first reference signal and a transmission of the uplink control information on the physical uplink control channel have happened to coincide in the same timing.

In this way, the mobile station apparatus, in the case where a transmission of a first reference signal and a transmission of uplink control information on a physical uplink control channel have happened to coincide in the same timing, performs transmission on the physical uplink control channel, and thus, can maintain a communication quality of a physical uplink control channel, and in addition, can perform efficiently transmission of a first reference signal and transmission on a physical uplink control channel.

(33) Furthermore, an integrated circuit of the present invention is an integrated circuit which causes a mobile station apparatus to exert a plurality of functions by being implemented in the mobile station apparatus, and the integrated circuit includes the functions of: transmitting a first reference signal to a base station apparatus in the case where information indicating a transmission of the first reference signal for channel estimation is included in a physical downlink control channel received from the base station apparatus; transmitting a second reference signal to the base station apparatus in accordance with information indicating a transmission of the second reference signal for channel estimation included in a radio resource control signal received from the base station apparatus; transmitting uplink control information to the base station apparatus by using a physical uplink control channel in accordance with information indicating a transmission on the physical uplink control channel included in the radio resource control signal received from the base station apparatus; and performing transmission of the uplink control information on the physical uplink control channel in the case where a transmission of the first reference signal, a transmission of the second reference signal and a transmission of the uplink control information on the physical uplink control channel have happened to coincide in the same timing.

In this way, the mobile station apparatus, in the case where a transmission of a first reference signal, a transmission of a second reference signal and a transmission of uplink control information on a physical uplink control channel have happened to coincide in the same timing, performs transmission on the physical uplink control channel, and thus, can maintain a communication quality of a physical uplink control channel by giving top priority to a transmission on the physical uplink control channel. In addition, it is possible to perform efficiently transmission of a first reference signal, transmission of a second reference signal and transmission on a physical uplink control channel.

(34) Moreover, an integrated circuit of the present invention is an integrated circuit which causes a mobile station apparatus to exert a plurality of functions by being implemented in the mobile station apparatus, and the integrated circuit includes the functions of: transmitting a first reference signal to a base station apparatus in the case where information indicating a transmission of the first reference signal for channel estimation is included in a physical downlink control channel received from the base station apparatus; transmitting a second reference signal to the base station apparatus in accordance with information indicating a transmission of the second reference signal for channel estimation included in a radio resource control signal received from the base station apparatus; and transmitting the first reference signal in accordance with information allowing a simultaneous transmission by a plurality of channels received from the base station apparatus, in the case where a transmission of the first reference signal and a transmission of the second reference signal have happened to coincide in the same timing, and the first reference signal and the second reference signal have been allocated by using the same radio resources.

In this way, the mobile station apparatus, in accordance with information allowing a simultaneous transmission by a plurality of channels received from the base station apparatus, in the case where a transmission of the first reference signal and a transmission of the second reference signal have happened to coincide in the same timing, and the first reference signal and the second reference signal have been allocated by using the same radio resources, transmits the first reference signal, and thus, can perform transmission of a reference signal for channel estimation and transmission on a physical uplink control channel efficiently in a short time.

Effect of the Invention

According to the present invention, a channel estimation accuracy in the case where a transmission of a first reference signal and a transmission of a second reference signal which are indicated by a different downlink signal (radio resource control signal or physical downlink control channel) have happened to coincide in the same timing can be maintained. In addition, a communication quality in the case where a transmission on a physical uplink control channel has happened to coincide in the same timing can be maintained. Thereby, it becomes possible to perform efficient communication.

BRIEF DESCRIPTION OF THE DRAWINGS

FIG. 9 is a figure showing an example of a transmission timing of the first reference signal (A-SRS), the second reference signal (P-SRS) and the Physical Uplink Control Channel (PUCCH) in the fourth embodiment of the present invention; and FIG. 10 is a figure showing a schematic structure of an uplink signal.

BEST MODES FOR CARRYING OUT THE INVENTION

Figure 1:
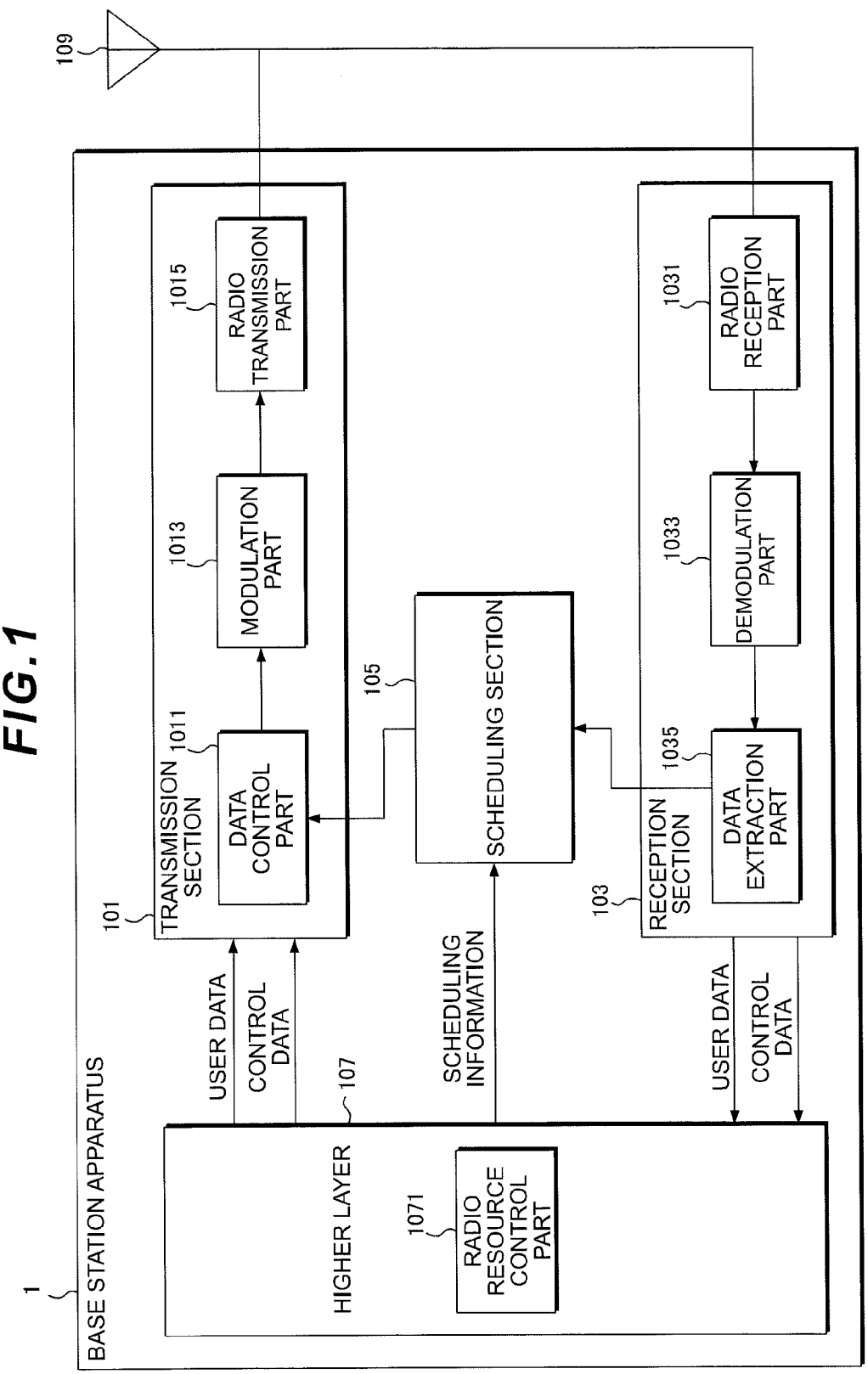
FIG. 1 is a block diagram showing a schematic functional structure of a base station apparatus 1 of the present invention.

Before starting specific description of each embodiment, a summary of a communication technology which is used in the present invention will be described briefly.

(Physical Channel)

Physical channels used for the present invention include a physical broadcast channel, a physical downlink shared channel, a physical downlink control channel, a downlink reference signal, a physical uplink shared channel, a physical uplink control channel, a physical random access channel, an uplink reference signal, etc. Even if a different type of a physical channel is added to above-mentioned physical channels, each embodiment later described of the present invention can be applied thereto.

A Physical Broadcast Channel (PBCH) is transmitted for the purpose of providing notification of a control parameter (broadcast information) used in common in mobile station apparatuses in a cell. Notification of resources of broadcast information, notification of which is not provided via a physical broadcast channel, is provided via a physical downlink control channel, and the broadcast information is transmitted by using a physical downlink shared channel. As broadcast information, notification of a cell global ID or the like indicating an ID (Identity, Identifier) which is individual to each cell is provided. On the PBCH, a Broadcast Channel (BCH) is mapped at a 40 millisecond interval. As for the 40-millisecond timing, blind detection is carried out in a mobile station apparatus. That is, for presenting a timing of a physical broadcast channel, explicit signaling is not transmitted to a mobile station apparatus. In addition, a sub-frame including a Physical Broadcast Channel (PBCH) can be decoded only in the sub-frame (self-decodable).

A Physical Downlink Control Channel (PDCCH) is a downlink channel transmitted to a mobile station apparatus from a base station apparatus, and is used in common to a plurality of mobile station apparatuses. A base station apparatus uses a downlink control channel for a transmission of transmission timing information and scheduling information (uplink/downlink resource allocation information). A Physical Downlink Shared Channel (PDSCH) is a channel used for transmitting downlink data or paging information. A radio resource control signal is transmitted by using a downlink shared channel.

A Downlink Reference Signal (DL-RS: Downlink Reference Signal or Cell-specific Reference Signal) is transmitted to a mobile station apparatus from a base station apparatus through the use of a downlink channel. A mobile station apparatus determines a downlink reception quality by measuring the downlink reference signal. Notification of the reception quality, as a CQI (Channel Quality Indicator) which is a quality information indicator, is provided to a base station apparatus by using a Physical Uplink Control Channel (PUCCH). Based on the CQI, notification of which has been received from a mobile station apparatus, the base station apparatus performs scheduling of a downlink communication for the mobile station apparatus. Meanwhile, as a reception quality, a SIR (Signal-to-Interference Ratio), a SINR (Signal-to-Interference plus Noise Ratio), a SNR (Signal-to-Noise Ratio), a CIR (Carrier-to-Interference Ratio), a BLER (Block Error Rate), a path loss, etc. can be used.

A Physical Uplink Shared Channel (PUSCH) is a channel used mainly for transmitting uplink data (UL-SCH). In the case where abase station apparatus carries out scheduling of a mobile station apparatus, channel status information (Channel Quality Indicator (CQI) of a downlink), a Precoding Matrix Indicator (PMI), a Rank Indicator (RI), and Acknowledgment (ACK)/Negative Acknowledgment (NACK) of a Hybrid Automatic Repeat Request (HARQ) for a downlink transmission are also transmitted through the use of a Physical Uplink Shared Channel (PUSCH). Here, the uplink data (UL-SCH) indicates, for example, a transmission of user data and the UL-SCH is a transport channel. In a UL-SCH, a HARQ and a dynamic adaptation radio link control are supported, and beam forming is available. In a UL-SCH, a dynamic resource allocation and a quasi-static resource allocation are supported.

A Physical Uplink Control Channel (PUCCH) is a channel used for transmitting control data. Here, the control data include, for example, channel status information (CQI, PMI, RI) transmitted (feedback) to a base station apparatus from a mobile station apparatus, a Scheduling Request (SR) in which a mobile station apparatus requests (requests a transmission by a UL-SCH) an allocation of resources for transmitting uplink data, ACK/NACK of a HARQ for the downlink transmission, and the like.

An Uplink Reference Signal (UL-RS) is transmitted from a mobile station apparatus to abase station apparatus. In the UL-RS, there are a Sounding Reference Signal (SRS) and a Demodulation Reference Signal (DM-RS). A base station apparatus performs channel estimation through the use of a sounding reference signal which is a reference signal for channel estimation, determines a reception quality of an uplink radio transmission signal of a mobile station apparatus, and performs scheduling of an uplink and adjustment of an uplink timing synchronization based on the reception quality.

Furthermore, a demodulation reference signal is transmitted together with a physical uplink shared channel, and is mainly used for calculating, in a base station apparatus, an amplitude of a signal and an amount of variations of a phase or frequency of a physical uplink shared channel, and demodulating a signal transmitted by using a physical uplink shared channel. A transmission bandwidth of a DM-RS is in agreement with a transmission bandwidth of a PUSCH, but a transmission bandwidth of a SRS is set independently of the DM-RS.

A transmission bandwidth of a SRS is set in advance in a base station apparatus. Frequency hopping is applied to a SRS in a time axis direction. As for the SRS, a frequency diversity effect and an equalization effect of interference are acquired by using the frequency hopping. A first reference signal (A-SRS: Aperiodic SRS) for channel estimation is an aperiodic reference signal for channel estimation transmitted in the case where a base station apparatus requests the transmission, and the timing at which the first reference signal is transmitted is set through the use of a physical downlink control channel. In addition, a second reference signal (P-SRS: Periodic SRS) for channel estimation is a reference signal for channel estimation transmitted in accordance with a transmission period configured by a base station apparatus in advance, and the timing at which the second reference signal is transmitted is set through the use of a radio resource control signal. Here, the timing means a sub-frame to which resources of each signal are allocated.

A Physical Random Access Channel (PRACH) is a physical channel used for transmitting a random access preamble, and has a guard time. The major object of the PRACH is for a mobile station apparatus to take a synchronization with a base station apparatus, and in addition, the PRACH is used for initial access, a handover, a re-connection request, and a scheduling request.

The scheduling request is information in which a mobile station apparatus indicates a request of allocation of resources of a physical uplink shared channel for a base station apparatus. A mobile station apparatus, in the case where information data to be transmitted to a buffer of the self device comes to be accumulated, and a resource allocation of a physical uplink shared channel is requested, transmits the scheduling request. In addition, a mobile station apparatus transmits the scheduling request to a base station apparatus through the use of a physical uplink control channel in resources allocated from a base station apparatus in advance.

Meanwhile, a base station apparatus allocates a periodic resource for a mobile station apparatus to arrange the scheduling request at the time of a communication connection start with a mobile station apparatus.

(Interface Protocol of Each Layer)

Each layer of a radio interface protocol between a mobile station apparatus and a network is classified into an L1 (first layer), an L2 (second layer), and an L3 (third layer) based on a reference model of an Open System Interconnection (OSI). A physical layer belonging to the first layer provides a higher layer with an information transfer service, through the use of a physical channel. Furthermore, the physical layer is connected with a Medium Access Control (MAC) layer of the second layer through a transport channel (referred to as a transmission channel). Then, data is transmitted between the MAC layer and the physical layer through the transport channel.

The MAC layer belonging to the second layer provides a Radio Link Control (RLC) layer with a service such as a resource allocation between a logical channel and a transport channel, through the logical channel. The RLC layer supports reliable data transmission. Since a function of the RLC layer may be embodied by a functional block in the MAC layer, the RLC layer may not exist. In addition, in the second layer, there exists a Packet Data Convergence Protocol (PDCP) layer other than the MAC layer and the RLC layer. The PDCP layer compresses a header information added to packet data to thereby be able to be transmitted efficiently in a radio link, and performs order control of a packet to prevent missing of data, and so on.

A Radio Resource Control (RRC) layer belonging to the third layer controls a transport channel and a physical channel in association with configuration, re-configuration, and releasing of a radio bearer. The RRC layer performs broadcasting or the like of system information and call information for a mobile station apparatus from a network, and also performs control of the first layer or the second layer which is required for them, and also performs control of resources between a mobile station apparatus and a network. Next, a structure of an uplink signal will be described.

(Structure of Uplink Signal)

FIG. 10 is a drawing showing a schematic structure of an uplink signal. In the same figure, a horizontal axis indicates a time axis, and a vertical axis indicates a frequency axis. In an example of the same drawing, fourteen symbols are located in a line in a time axis direction. Seven symbols correspond to one slot, and the length of one slot is 0.5 milliseconds (ms). In addition, 14 symbols (equivalent to two slots) correspond to one sub-frame, and the length of one sub-frame is 1 millisecond. Meanwhile, FIG. 10 shows a structure of an uplink signal of one component carrier.

In an uplink signal in which one sub-frame is composed of 14 symbols, a SRS is allocated to the 14th symbol. That is, a SRS is allocated to the last symbol in a certain subframe. A resource (bandwidth in a frequency direction) of the SRS allocated to the 14th symbol is set in accordance with an uplink system bandwidth or a transmit power of a mobile station apparatus. In addition, to a PRACH, a bandwidth and a time symbol length are changed and allocated depending on a type of a message and a format to be transmitted. In the present invention, through the use of a plurality of component carriers shown in FIG. 10, a mobile station apparatus transmits an uplink signal. Hereinafter, an embodiment of the present invention will be described with reference to drawings.

<First Embodiment>

A first embodiment will be described in the following. In the first embodiment, a base station apparatus transmits a physical downlink control channel including information indicating a transmission of a first reference signal for channel estimation and a radio resource control signal including information indicating a transmission of a second reference signal for channel estimation, to a mobile station apparatus. A mobile station apparatus, in the case where information indicating a transmission of a first reference signal is included in a physical downlink control channel, can transmit a first reference signal to a base station apparatus, and in accordance with information indicating a transmission of a second reference signal included in a radio resource control signal, can transmit a second reference signal to the base station apparatus, and in the case where a transmission of a first reference signal and a transmission of a second reference signal have happened to coincide in the same timing, can perform transmission of a first reference signal.

In the first embodiment, there is shown a transmission control of a mobile station apparatus in the case where a transmission of an aperiodic first reference signal (Aperiodic SRS; A-SRS) for channel estimation transmitted when a base station apparatus requests the transmission and a transmission of a second reference signal (Periodic SRS; P-SRS) for channel estimation periodically transmitted at a timing a base station apparatus sets, happen to coincide in the same timing. For example, information indicating a transmission of a first reference signal is included in a physical downlink control channel, and information indicating a transmission of a second reference signal is included in a radio resource control signal.

FIG. 1 is a block diagram showing a schematic functional structure of a base station apparatus 1 of the present invention. The base station apparatus 1 includes a transmission section 101, a reception section 103, a scheduling section 105, a higher layer 107, and an antenna 109. The transmission section 101 includes a data control part 1011, a modulation part 1013, and a radio transmission part 1015. In addition, the reception section 103 includes a radio reception part 1031, a demodulation part 1033, and a data extraction part 1035. The data control part 1011 inputs user data and control data, and based on an indication from the scheduling section 105, arranges the control data in a PDCCH, and arranges transmission data and the control data for each mobile station apparatus 3 in a PDSCH. The modulation part 1013 performs signal processing such as data modulation, serial/parallel conversion of an input signal, IFFT, CP insertion, and filtering, and generates a transmission signal. The radio transmission part 1015 transmits modulated data to the mobile station apparatus 3 via the antenna 109 after up-converting the modulated data to a radio frequency.

The radio reception part 1031 receives an uplink signal from the mobile station apparatus 3, down-converts the received data to a baseband signal, and outputs it to the demodulation part 1033. The data extraction part 1035 checks whether or not the received data is correct or incorrect, and notifies the scheduling section 105 of the check result. The data extraction part 1035, when the received data is correct, separates the received data into user data and control data. The data extraction part 1035 outputs control data of the second layer in the control data, such as channel quality indication information of a downlink, and Acknowledgement/Negative-Acknowledgment (ACK/NACK) of downlink data, to the scheduling section 105, and outputs other control data of the third layer, etc. and user data, to the higher layer 107. The data extraction part 1035, when the received data is incorrect, stores it to be synthesized with retransmission data, and when receiving the retransmission data, performs a synthesizing processing.

The scheduling section 105 performs scheduling for arranging user data and control data in a PDSCH or a PDCCH. The higher layer 107 performs processing of a Medium Access Control (MAC) layer, a Radio Link Control (RLC) layer, a Packet Data Convergence Protocol (PDCP) layer and a Radio Resource Control (RRC) layer. As for the higher layer 107, for integrating and controlling a processing part of a lower layer, an interface exists between the higher layer 107 and each of the scheduling section 105, the antenna 109, the transmission section 101 and the reception section 103 (however, not shown).

The higher layer 107 has a radio resource control part 1071 (also referred to as a control part). In addition, the radio resource control part 1071 performs control of various configuration information, control of system information, paging control, control of a communication state of each mobile station apparatus, mobility control of hand-over or the like, control of a buffer status for every mobile station apparatus, control of connection configurations of a unicast and multicast bearer, control of a mobile station identifier (UEID), and the like. Moreover, the higher layer 107 delivers and receives information to/from another base station apparatus and a higher node.

Figure 2:
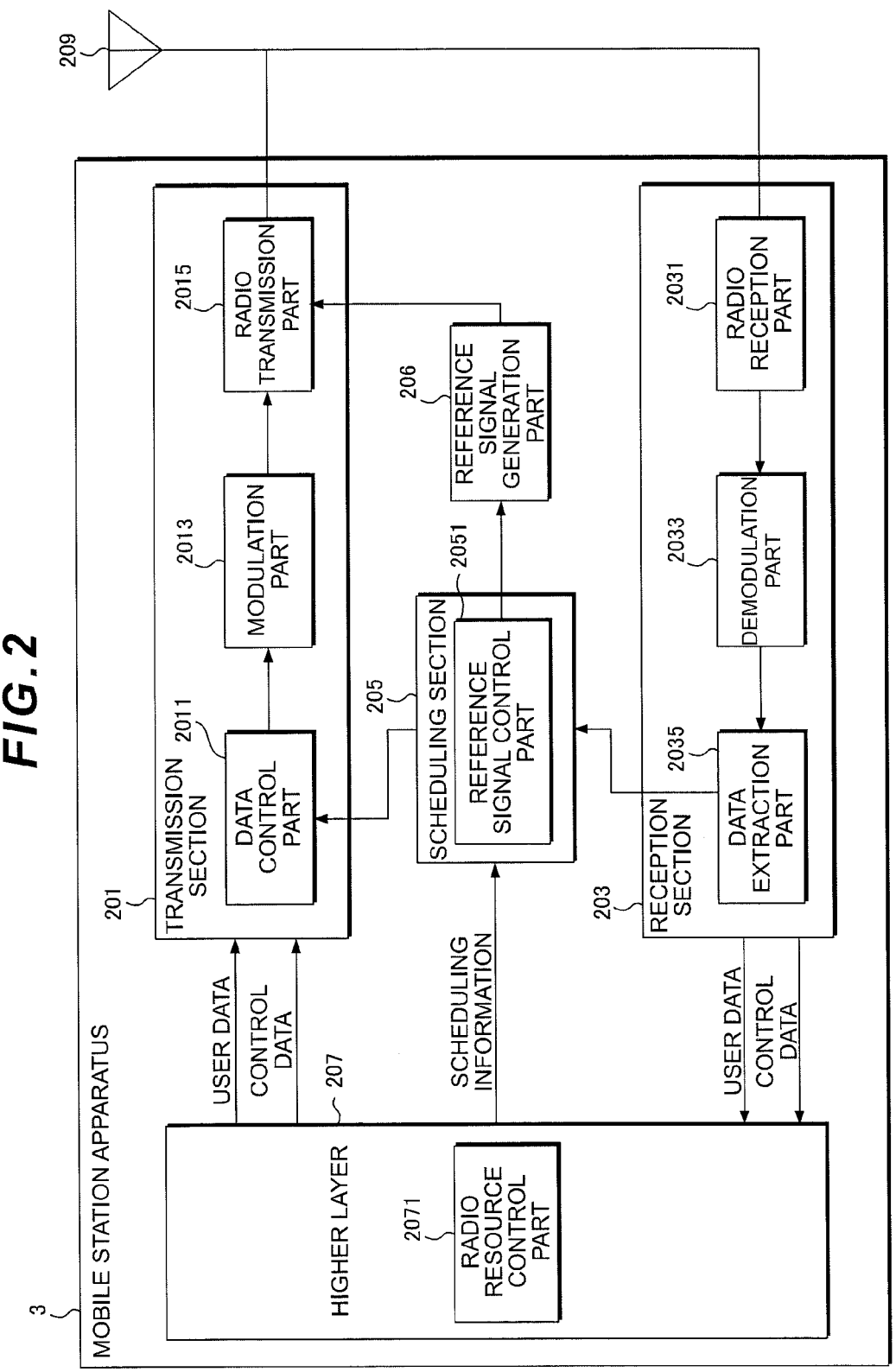
FIG. 2 is a block diagram showing a schematic functional structure of a mobile station apparatus 3 of the present invention.

FIG. 2 is a block diagram showing a schematic functional configuration of the mobile station apparatus 3 of the present invention. The mobile station apparatus 3 includes a transmission section 201, a reception section 203, a scheduling section 205, a reference signal generation part 206, a higher layer 207, and an antenna 209. The transmission section 201 includes a data control part 2011, a modulation part 2013, and a radio transmission part 2015. In addition, the reception section 203 includes a radio reception part 2031, a demodulation part 2033, and a data extraction part 2035.

User data and control data are inputted into the data control part 2011 from the higher layer 207. The data control part 2011 arranges the inputted data in a PUSCH or a PUCCH based on an indication from the scheduling section 205. The modulation part 2013 performs data modulation of the PUSCH or the PUCCH, and outputs it to the radio transmission part 2015. The radio transmission part 2015 performs signal processing of the modulated data and an uplink reference signal, such as Discrete Fourier Transform (DFT), subcarrier mapping, Inverse Fast Fourier Transform (IFFT), CP (Cyclic Prefix) insertion and filtering, and generates a transmission signal, and carries out up-conversion of the transmission signal to a radio frequency and thereafter, transmits it to the base station apparatus 1 via the antenna 209.

The radio reception part 2031 receives a downlink signal from the base station apparatus 1, down-converts the reception signal to a baseband signal, and thereafter, outputs it to the demodulation part 2033. The demodulation part 2033 demodulates the received data. The data extraction part 2035 separates the received data into user data and control data. In addition, the data extraction part 2035 outputs to the scheduling section 205 scheduling information, control data with respect to a random access response message and intermittent reception control and the other control data of the second layer, and outputs user data to the higher layer 207.

The scheduling section 205 analyzes the control data inputted from the data extraction part 2035, and generates uplink scheduling information, and on the basis of the scheduling information, instructs the data control parts 2011 to allocate the user data and the control data to a PUSCH and a PUCCH.

Furthermore, the scheduling section 205 includes a reference signal control part 2051. The reference signal control part 2051 takes out SRS configuration information on the basis of scheduling information transmitted from the base station apparatus 1. Moreover, the reference signal control part 2051 performs transmission control in the case where a first reference signal and second reference signal for channel estimation and a physical uplink control channel have happened to coincide in the same timing, and generates SRS transmission control information. The reference signal control part 2051 outputs the SRS configuration information and the SRS transmission control information to the reference signal generation part 206. Here, the SRS configuration information is the information for setting parameters such as a transmission bandwidth and a transmission period of the SRS. The SRS transmission control information is the information indicating a transmission control method of a SRS in the case where a SRS and other uplink channels (PUSCH and PUCCH) are allocated to the same sub-frame. For example, the SRS transmission control information is the information for performing indication so that the mobile station apparatus 3 may perform processing of not transmitting the SRS in the case where the SRS and the PUCCH happen to coincide in the same sub-frame.

The reference signal generation part 206, on the basis of the SRS configuration information and SRS transmission control information inputted from the reference signal control part 2051, generates a first reference signal and/or second reference signal to be outputted to the radio transmission part 2015.

The higher layer 207 performs processing of a Medium Access Control (MAC) layer, a Radio Link Control (RLC) layer, a Packet Data Convergence Protocol (PDCP) layer, and a Radio Resource Control (RRC) layer. As for the higher layer 207, for integrating and controlling a processing part of a lower layer, an interface exists between the higher layer 207 and each of the scheduling section 205, the antenna 209, the transmission section 201 and the reception section 203 (however, not shown).

The higher layer 207 has a radio resource control part 2071 (also referred to as a control part). The radio resource control part 2071 performs control of various configuration information, control of system information, paging control, control of a communication state of its own station, movement control of hand-over or the like, control of a buffer status, control of connection configurations of a unicast and multicast bearer, control of a mobile station identifier (UEID).

A transmission of a first reference signal and a transmission of a second reference signal are indicated from the base station apparatus 1 to the mobile station apparatus 3 via a different downlink signal. That is, a transmission indication of a first reference signal and a transmission indication of a second reference signal are not necessarily performed in the same timing. As for the first reference signal (A-SRS), since transmission timing thereof is indicated from the base station apparatus 1, the mobile station apparatus 3 can perform a dynamic transmission of a reference signal for channel estimation. In contrast, a second reference signal (P-SRS) is transmitted to the base station apparatus 1 in a prescribed transmission period until the base station apparatus 1 performs re-configuration.

Figure 3A:
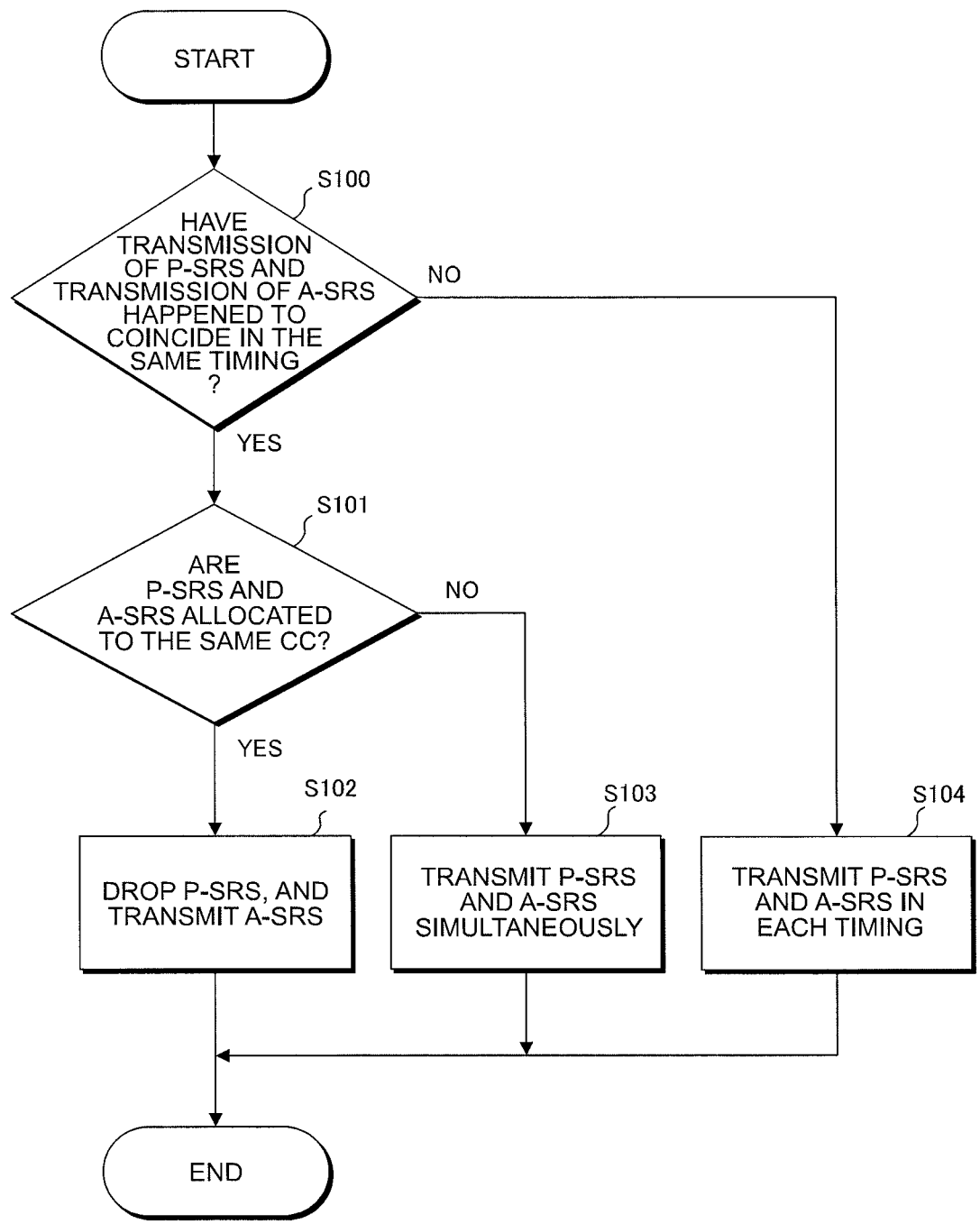
FIG. 3A is a flow chart showing a processing procedure of a transmission control of the mobile station apparatus 3 in the case where a transmission of a first reference signal (A-SRS) and a transmission of a second reference signal (P-SRS) have happened to coincide in the same timing in a first embodiment of the present invention.

FIG. 3A is a flow chart showing a processing procedure of a transmission control of the mobile station apparatus 3 in the case where a transmission of a first reference signal (A-SRS) and a transmission of a second reference signal (P-SRS) have happened to coincide in the same timing in the first embodiment of the present invention. The mobile station apparatus 3 determines whether or not a transmission of a first reference signal and a transmission of a second reference signal have happened to coincide in the same timing (Step S100). In the case where a first reference signal and a second reference signal have happened to coincide in the same timing (Step S100: YES), the mobile station apparatus 3 determines whether or not a first reference signal and a second reference signal are allocated to the same Component Carrier (CC) (Step S101). In the case where a first reference signal and a second reference signal are allocated to the same CC (Step S101: YES), the mobile station apparatus 3 transmits a first reference signal without transmitting a second reference signal (Step S102). That is, the mobile station apparatus 3 transmits a first reference signal without dropping a second reference signal.

Furthermore, in the case where a first reference signal and a second reference signal are allocated to different component carriers (Step S101: NO), the mobile station apparatus 3 performs transmission of a first reference signal and transmission of a second reference signal simultaneously (Step S103). In the case where a transmission of a first reference signal and a transmission of a second reference signal have not happened to coincide in the same timing (Step S100: NO), the mobile station apparatus 3 transmits a first reference signal and a second reference signal in each timing to the base station apparatus 1 (Step S104). However, as exception processing, in the case where the sum total transmit power of a first reference signal and a second reference signal which have happened to coincide in the same timing exceeds a maximum transmit power of the mobile station apparatus 3, the mobile station apparatus 3, even if a first reference signal and a second reference signal have happened to coincide in different component carriers in the same timing, transmits a first reference signal without transmitting a second reference signal.

In the first embodiment, in the case where a first reference signal for uplink channel estimation transmitted at the timing set by the base station apparatus 1 and a second reference signal for uplink channel estimation transmitted when notification of a transmission request is received from the base station apparatus 1 have happened to coincide in the same timing, depending on whether the allocation thereof is carried out to the same or a different component carrier, the mobile station apparatus 3 can control whether or not a first reference signal and a second reference signal are transmitted simultaneously.

In the case where a first reference signal and a second reference signal happen to coincide in the same component carrier in the same timing, a channel estimation accuracy of a first reference signal and a second reference signal may deteriorate. In more details, in the case where sources of a first reference signal and a second reference signal are allocated to the same component carrier in the same subframe and both resources have overlapped, a first reference signal and a second reference signal interfere with each other, and a channel estimation accuracy deteriorates in the base station apparatus 1. Therefore, if control is carried out so that a first reference signal to be transmitted after the base station apparatus 1 provides notification of a transmission request may be transmitted preferentially, a case where a channel estimation accuracy of a first reference signal deteriorates can be avoided.

In the case where a first reference signal and a second reference signal happen to coincide indifferent component carriers, resources of a first reference signal and second reference signal do not overlap and a channel estimation accuracy is not deteriorated, and thus it is possible to carry out control so that a plurality of reference signals may be transmitted simultaneously in the same timing. Depending on whether each resource of a first reference signal and second reference signal is allocated to the same or a different component carrier, by controlling whether or not to transmit a first reference signal and second reference signal simultaneously, it is possible to avoid, with simple processing, the fact that both reference signals interfere with each other and channel estimation accuracies of both reference signals deteriorate in the base station apparatus 1.

Figure 3B:
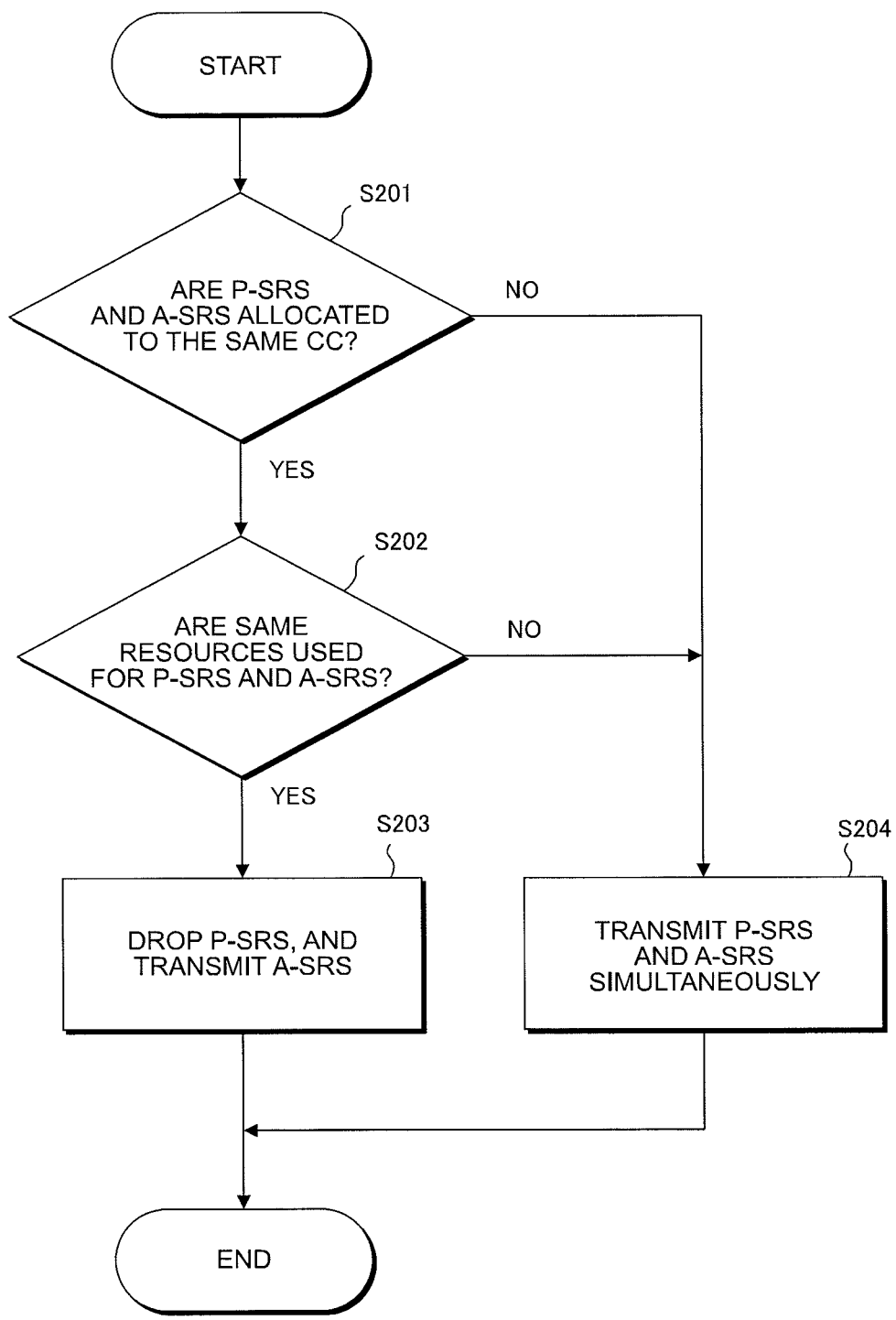
FIG. 3B is a flow chart showing a processing procedure of a transmission control of the mobile station apparatus 3 in the case where a transmission of the first reference signal (A-SRS) and a transmission of the second reference signal (P-SRS) have happened to coincide in the same timing in the first embodiment of the present invention.

FIG. 3B is a flow chart showing a processing procedure of a transmission control of the mobile station apparatus 3 in the case where a transmission of a first reference signal (A-SRS) and a transmission of a second reference signal (P-SRS) have happened to coincide in the same timing in the first embodiment of the present invention. In the case where each resource of a first reference signal and second reference signal is allocated to the same component carrier, by performing, furthermore, determining whether or not both resources have overlapped, it is possible to improve a channel estimation accuracy for a second reference signal.

In FIG. 3B, it is determined whether or not resources of a P-SRS and an A-SRS have overlapped (Step S202) between Step S101 and Step S102 of FIG. 3A. In the case where it is determined that resources of the P-SRS and the A-SRS have overlapped (Step S202: YES), the P-SRS is dropped and the A-SRS is transmitted (Step S203). In the case where it is determined that resources of the P-SRS and the A-SRS have not overlapped (Step S202: NO), the P-SRS and the A-SRS are transmitted simultaneously (Step S204). Thereby, while avoiding the interference of a first reference signal and a second reference signal with each other, it is possible to further increase an opportunity to transmit a second reference signal, and it is possible to improve a channel estimation accuracy for a second reference signal in the base station apparatus 1.

Here, the fact that a transmission of a first reference signal and a transmission of a second reference signal happen to coincide in the same timing, when described by using FIG. 10, indicates that one mobile station apparatus allocates and transmits a first reference signal and a second reference signal simultaneously in the 14th symbol (slash part) in which a transmission of a first reference signal and a transmission of a second reference signal have been indicated by the base station apparatus 1, and indicates that the transmission timing thereof is in agreement in a symbol unit. The mobile station apparatus 3 can determine whether or not a transmission of a first reference signal and a transmission of a second reference signal have happened to coincide in the same timing in the 14th symbol. A timing in which a first reference signal is transmitted may be set in advance so that the first reference signal may be transmitted in a prescribed sub-frame, or may be the timing in which the first reference signal may be transmitted after prescribed sub-frames after notification via a physical downlink control channel is provided, and may be the timing in which the first reference signal may be transmitted in accordance with a transmission period of a second reference signal.

In this way, in the case where a transmission of a first reference signal and a transmission of a second reference signal happen to coincide in different component carriers in the same timing, it is possible to transmit a first reference signal and a second reference signal simultaneously. In the case where a first reference signal and a second reference signal have happened to coincide in the same timing, depending on whether they have happened to coincide in the same component carrier, it is possible to determine whether or not to perform a simultaneous transmission of a first reference signal and a second reference signal.

According to the present invention, the mobile station apparatus 3, depending on whether a first reference signal and a second reference signal have been allocated to the same component carrier, it is possible to control whether or not to perform transmission of a first reference signal and transmission of a second reference signal simultaneously, and it is possible to transmit a first reference signal and a second reference signal to the base station apparatus 1 efficiently.

<Second Embodiment>

Then, a second embodiment of the present invention will be described. In the second embodiment, the base station apparatus 1 transmits, to the mobile station apparatus 3, a radio resource control signal including information indicating a transmission on a physical uplink control channel and a physical downlink control channel including information indicating a transmission of a first reference signal for channel estimation. The mobile station apparatus 3, in accordance with information indicating a transmission on a physical uplink control channel, which is included in a radio resource control signal, transmits uplink control information to the base station apparatus 1 by using a physical uplink control channel, and in the case where information indicating a transmission of a first reference signal is included in a physical downlink control channel, transmits a first reference signal to the base station apparatus 1, and in the case where a transmission of a first reference signal and a transmission on a physical uplink control channel have happened to coincide in the same timing, can perform transmission on a physical uplink control channel.

Since function configurations of apparatuses in the second embodiment are the same as those of what have been shown in the first embodiment, descriptions thereof are omitted here. A transmission on a physical uplink control channel where the transmission is periodically indicated by a radio resource control signal and a transmission of a first reference signal for channel estimation where the transmission is aperiodically indicated by a physical downlink control channel may happen to coincide in the same timing. In the case where by a different downlink signal a transmission of a different uplink signal is indicated from the base station apparatus 1, the mobile station apparatus 3, based on information included in the uplink signal to be transmitted, can perform an efficient communication by setting a priority of transmission signals.

Figure 4:
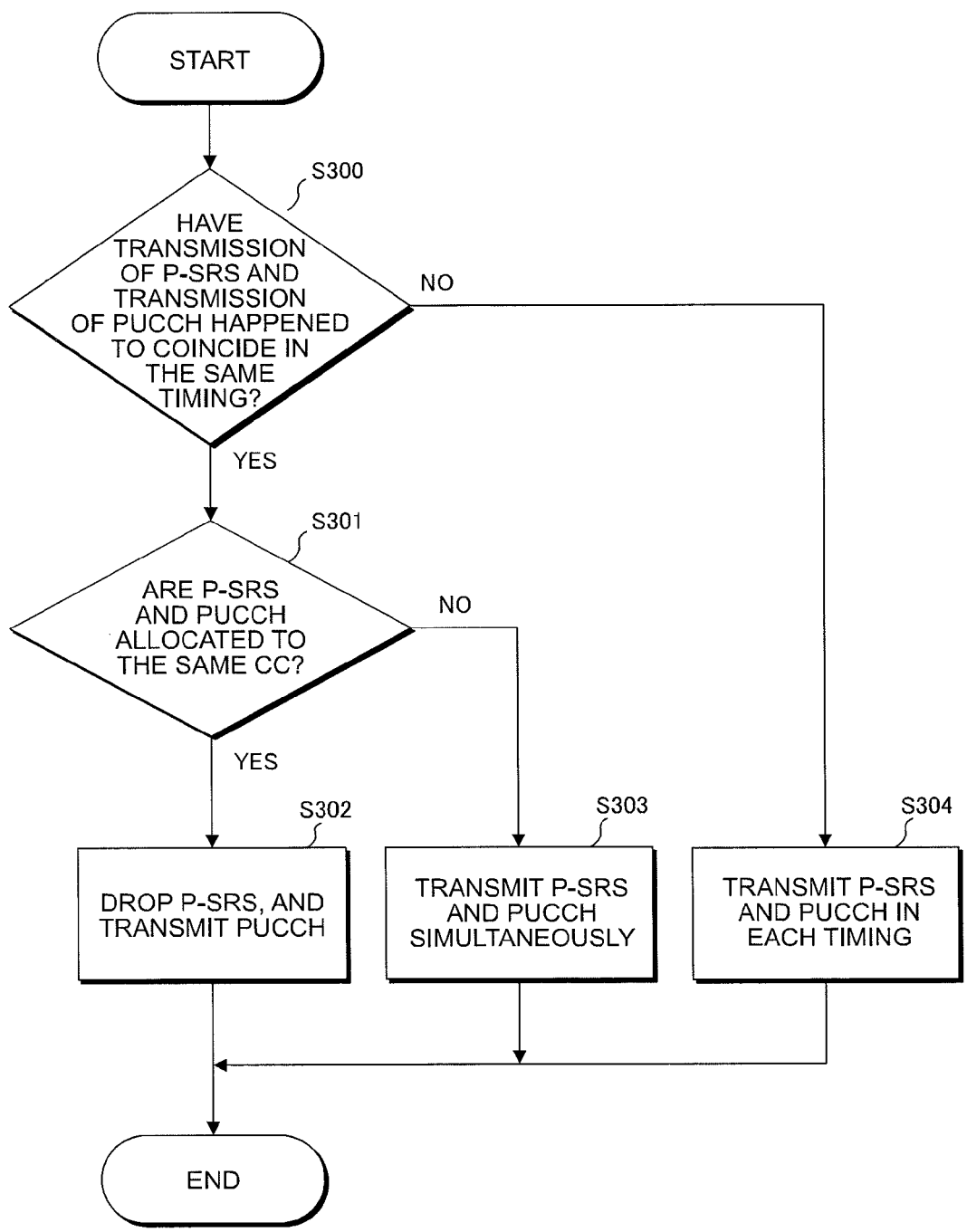
FIG. 4 is a flow chart showing a processing procedure of a transmission control of the mobile station apparatus 3 in the case where a transmission of the first reference signal (A-SRS) and a transmission on a physical uplink control channel (PUCCH) have happened to coincide in the same timing in a second embodiment of the present invention.

FIG. 4 is a flow chart showing a processing procedure of a transmission control of the mobile station apparatus 3 in the case where a transmission of a first reference signal (A-SRS) and a transmission on a physical uplink control channel (PUCCH) have happened to coincide in the same timing in the second embodiment of the present invention. The mobile station apparatus 3 determines whether or not a transmission of a first reference signal and a transmission on a physical uplink control channel have happened to coincide in the same timing (Step S300). In the case where a transmission of a first reference signal and a transmission on a physical uplink control channel have happened to coincide in the same timing (Step S300: YES), the mobile station apparatus 3 determines whether or not a first reference signal and a physical uplink control channel are allocated to the same Component Carrier (CC) (Step S301).

In the case where a first reference signal and a physical uplink control channel are allocated to the same CC (Step S301: YES), the mobile station apparatus 3 transmits a physical uplink control channel without transmitting (dropping) a first reference signal (Step S302). Moreover, in the case where a first reference signal and a physical uplink control channel are allocated to different component carriers (Step S301: NO), the mobile station apparatus 3 performs transmission of a first reference signal and transmission on a physical uplink control channel simultaneously (Step S303). In the case where a transmission of a first reference signal and a transmission on a physical uplink control channel have not happened to coincide in the same timing (Step S300: NO), the mobile station apparatus 3 transmits a first reference signal and a physical uplink control channel in each timing (Step S304). However, as exception processing, in the case where the sum total transmit power of a first reference signal and a physical uplink control channel which have happened to coincide in the same timing exceeds the maximum transmit power of the mobile station apparatus 3, the mobile station apparatus 3, even if a first reference signal and a physical uplink control channel have happened to coincide in different component carriers in the same timing, transmits a physical uplink control channel without transmitting a first reference signal.

The mobile station apparatus 3, in the case where a transmission of a first reference signal and a transmission on a physical uplink control channel have happened to coincide in the same timing, in order to suppress an increase of a PAPR (Peak-to-Average Power Ratio) due to a multi-carrier transmission, prioritizes a transmission on a physical uplink control channel. Here, the PAPR is a ratio of a peak power value to an average power value in a transmission signal. Moreover, in the case where a signal, PAPR of which is high is inputted into an amplifier, a nonlinear distortion due to amplification will arise, and a communication quality deteriorates. Furthermore, in order to avoid the nonlinear distortion, if a high output back-off is provided from the maximum transmit power, power efficiency deteriorates remarkably. In the case where a transmission of a first reference signal and a transmission on a physical uplink control channel have happened to coincide in different component carriers in the same timing, it is possible to carry out simultaneous transmission since a communication quality of an uplink signal does not deteriorate.

In this way, in the second embodiment, in the case where a transmission of a first reference signal and a transmission on a physical uplink control channel have happened to coincide in the same timing, the mobile station apparatus 3 can carry out control so as to perform transmission on a physical uplink control channel without transmitting (dropping) a first reference signal. In addition, the mobile station apparatus 3, depending on whether a transmission of a first reference signal and a transmission on a physical uplink control channel have happened to coincide in the same timing, can determine whether or not to carry out a simultaneous transmission.

According to the present invention, a transmission control method of the mobile station apparatus 3 in the case where a transmission of a first reference signal and a transmission on a physical uplink control channel have happened to coincide in the same timing can be provided, and a communication quality of a physical uplink control channel can be maintained. The mobile station apparatus 3, by determining whether or not to carry out simultaneous transmission depending on whether a first reference signal and a physical uplink control channel are allocated to the same component carrier, can perform efficiently transmission of a first reference signal and transmission on a physical uplink control channel.

<Third Embodiment>

Then, a third embodiment of the present invention will be described. The base station apparatus 1 transmits, to the mobile station apparatus 3, a physical downlink control channel including information indicating a transmission of a first reference signal for channel estimation, and a radio resource control signal including information indicating a transmission of a second reference signal for channel estimation and information indicating a transmission on a physical uplink control channel. The mobile station apparatus 3, in the case where information indicating a transmission of a first reference signal is included in a physical downlink control channel, transmits a first reference signal to the base station apparatus 1, and in accordance with information indicating a transmission of a second reference signal included in a radio resource control signal, transmits a second reference signal to the base station apparatus 1, and in accordance with information indicating a transmission on the physical uplink control channel included in a radio resource control signal, transmits uplink control information to the base station apparatus 1 by using a physical uplink control channel, and in the case where a transmission of a first reference signal, a transmission of a second reference signal and a transmission on a physical uplink control channel have happened to coincide in the same timing, can perform transmission on a physical uplink control channel.

Since function configurations of apparatuses in the third embodiment are the same as those of what have been shown in the first embodiment, descriptions thereof are omitted here. In the third embodiment, there is shown a transmission control of the mobile station apparatus 3 in the case where a transmission of a first reference signal, a transmission of a second reference signal and a transmission on a physical uplink control channel have happened to coincide in the same timing.

Figure 5:
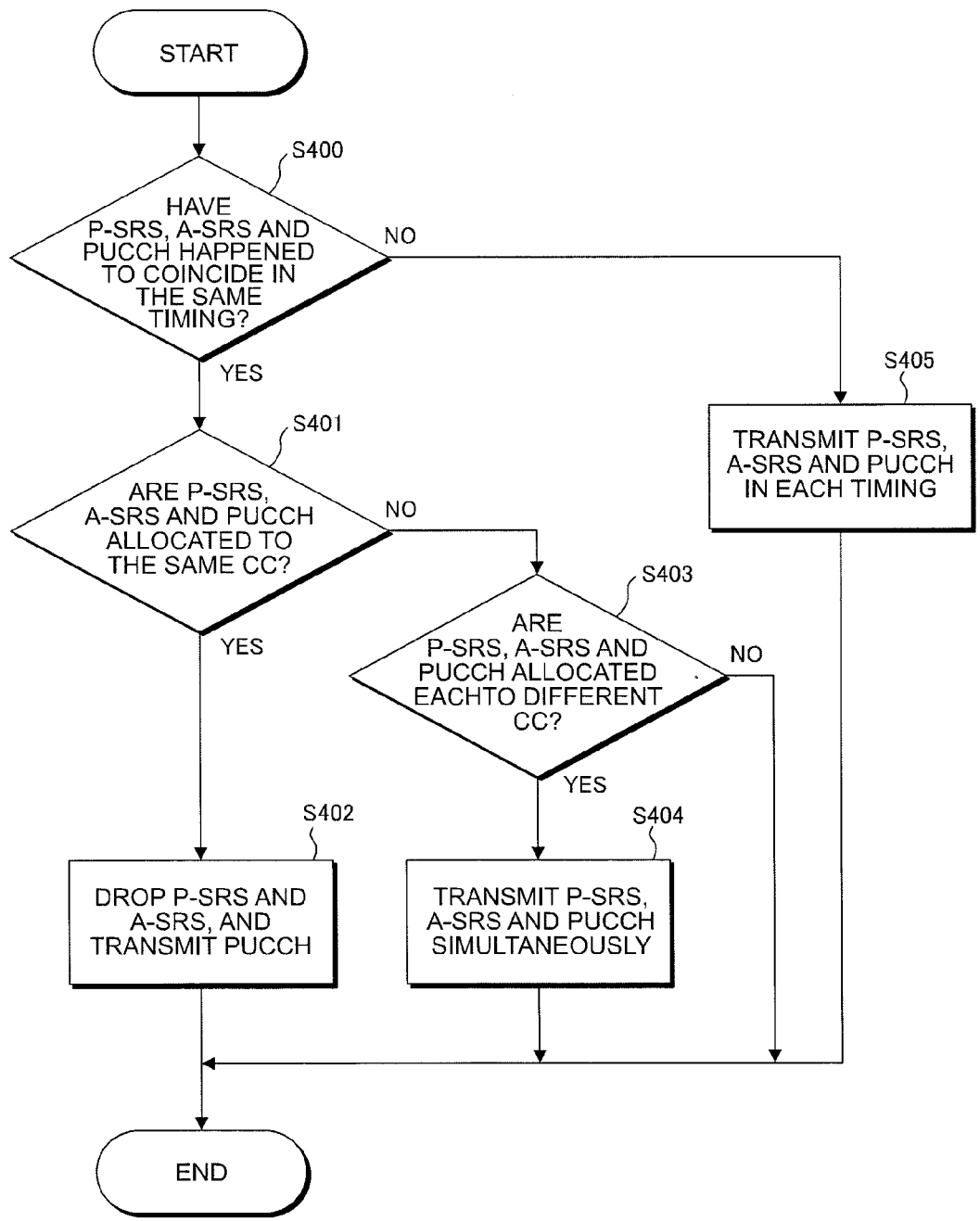
FIG. 5 is a flow chart showing a processing procedure of a transmission control of the mobile station apparatus 3 in the case where a transmission of the first reference signal (A-SRS) and a transmission of the second reference signal (P-SRS) and a transmission on the physical uplink control channel (PUCCH) have happened to coincide in the same timing in a third embodiment of the present invention.

FIG. 5 is a flow chart showing a processing procedure of a transmission control of the mobile station apparatus 3 in the case where a transmission of a first reference signal (A-SRS) and a transmission of a second reference signal (P-SRS) and a transmission on a physical uplink control channel (PUCCH) have happened to coincide in the same timing in the third embodiment of the present invention. The mobile station apparatus 3 determines whether or not a transmission of a first reference signal, a transmission of a second reference signal and a transmission on a physical uplink control channel have happened to coincide in the same timing (Step S400). In the case where a transmission of a first reference signal, a transmission of a second reference signal and a transmission on a physical uplink control channel have happened to coincide in the same timing (Step S400: YES), the mobile station apparatus 3 determines whether or not a first reference signal, a second reference signal and a physical uplink control channel are allocated to the same Component Carrier (CC) (Step S401). In the case where a first reference signal, a second reference signal and a physical uplink control channel are allocated to the same CC (Step S401: YES), the mobile station apparatus 3 transmits a physical uplink control channel without transmitting a first reference signal and a second reference signal (Step S402). That is the mobile station apparatus 3 transmits a physical uplink control cahnnel dropping a first reference signal and a second reference signal.

In the case where a first reference signal, a second reference signal and a physical uplink control channel are not allocated to the same component carrier (Step S401: NO), the mobile station apparatus 3 determines whether or not a first reference signal, a second reference signal and a physical uplink control channel are allocated each to different component carriers (Step S403). In the case where a first reference signal, a second reference signal and a physical uplink control channel are allocated each to different component carriers (Step S403: YES), the mobile station apparatus 3 transmits simultaneously a first reference signal, a second reference signal and a physical uplink control channel (Step S404).

In the case where any of two among a first reference signal, a second reference signal and a physical uplink control channel are allocated to the same component carrier (Step S403: NO), the mobile station apparatus 3 performs processing described in the first and second embodiment, and thus descriptions here are omitted. In the case where a transmission of a first reference signal, a transmission of a second reference signal and a transmission on a physical uplink control channel have not happened to coincide in the same timing (Step S400: NO), the mobile station apparatus 3 transmits a first reference signal, a second reference signal and a physical uplink control channel in each timing (Step S405). However, as exception processing, in the case where the sum total transmit power of a first reference signal, a second reference signal and a physical uplink control channel which have happened to coincide in the same timing exceeds the maximum transmit power of the mobile station apparatus 3, even if a first reference signal, a second reference signal and a physical uplink control channel have happened to coincide in different component carriers in the same timing, the mobile station apparatus 3 transmits a physical uplink control channel without transmitting a first reference signal and a second reference signal.

Furthermore, in the case where a transmission of a first reference signal, a transmission of a second reference signal and a transmission on a physical uplink control channel have happened to coincide in different component carriers in the same timing, a channel estimation accuracy of a first reference signal and a second reference signal in each component carrier does not deteriorate, and thus the mobile station apparatus 3 can perform simultaneously transmission of a first reference signal, transmission of a second reference signal and transmission on a physical uplink control channel.

In this way, in the case where a transmission of a first reference signal, a transmission of a second reference signal and a transmission on a physical uplink control channel have happened to coincide in the same timing, the mobile station apparatus 3 can maintain a communication quality of a physical uplink control channel by giving top priority to a transmission on the physical uplink control channel. In addition, the mobile station apparatus 3, depending on whether or not a transmission of a first reference signal, a transmission of a second reference signal and a transmission on a physical uplink control channel have happened to coincide in the same component carrier, can control whether or not to perform transmission of each signal simultaneously.

According to the present invention, even in the case of a transmission of a first reference signal, a transmission of a second reference signal and a transmission on a physical uplink control channel have happened to coincide in the same timing, a communication quality of a physical uplink control channel is maintained by dropping a first reference signal and a second reference signal, and in the case where a first reference signal, a second reference signal and a physical uplink control channel are allocated to different component carriers, it is possible to perform efficiently transmission of a first reference signal, a transmission of a second reference signal and a transmission on a physical uplink control channel by performing transmission of each signal simultaneously.

[Fourth Embodiment]

Then, a fourth embodiment of the present invention will be described. First, a basic configuration will be described and a modification example will be described after that. In a basic configuration of the fourth embodiment, the base station apparatus 1 transmits, to the mobile station apparatus 3, a physical downlink control channel including information indicating a transmission of a first reference signal for channel estimation, and a radio resource control signal including information indicating a transmission of a second reference signal for channel estimation, and a signal including information allowing a simultaneous transmission by a plurality of uplink channels. The mobile station apparatus 3, in the case where information indicating a transmission of a first reference signal is included in a physical downlink control channel, transmits a first reference signal to the base station apparatus 1, and in accordance with information indicating a transmission of a second reference signal included in a radio resource control signal, transmits a second reference signal to the base station apparatus 1, and in accordance with information allowing a simultaneous transmission by a plurality of uplink channels, can perform transmission of a first reference signal and a second reference signal simultaneously in the case where a transmission of a first reference signal and a transmission of a second reference signal have happened to coincide in the same timing.

Since function structures of apparatuses in the fourth embodiment are the same as those of what have been shown in the first embodiment, descriptions thereof are omitted here. There is shown a processing procedure of a transmission control of the mobile station apparatus 3 in the case where the base station apparatus 1 allows the mobile station apparatus 3 to perform simultaneous transmission by a plurality of uplink channels. The simultaneous transmission in a plurality of uplink channels means performing simultaneous transmission of a plurality of PUSCHs, simultaneous transmission of a plurality of PUCCHs, simultaneous transmission of the PUSCH and PUCCH, etc., not depending on whether the channels have been allocated in the same or different component carriers (not depending on the number of component carriers where uplink channels are allocated).

The information mentioned above allowing a simultaneous transmission by a plurality of uplink channels is included in simultaneous transmission control information. In the case where the information that a simultaneous transmission by a plurality of channels is allowed is included in the simultaneous transmission control information, the mobile station apparatus 3 can perform simultaneous transmission of a plurality of uplink channels, and in the case where the information that a simultaneous transmission by a plurality of channels is not allowed is included in the simultaneous transmission control information, the mobile station apparatus 3 does not perform simultaneous transmission by a plurality of channels. Meanwhile, simultaneous transmission control information in the fourth embodiment may be transmitted by using a broadcast channel, and may be transmitted by using a radio resource control signal, and may be transmitted by using a physical downlink control channel.

Figure 6:
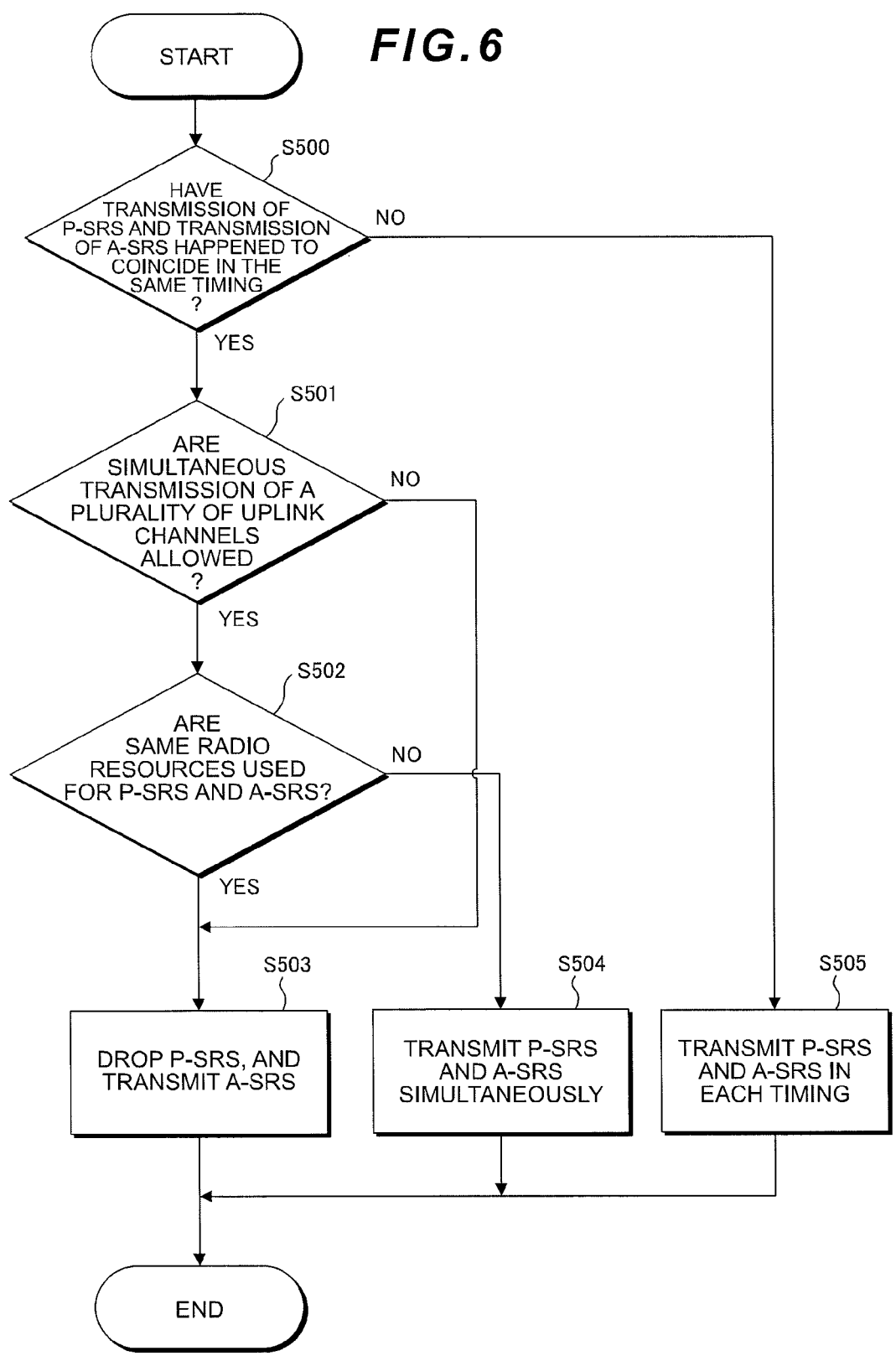
FIG. 6 is a flow chart showing a processing procedure of a transmission control of the mobile station apparatus 3 in the case where a transmission of the first reference signal (A-SRS) and a transmission of the second reference signal (P-SRS) have happened to coincide in the same timing in a basic configuration of a fourth embodiment of the present invention.

FIG. 6 is a flow chart showing a processing procedure of a transmission control of the mobile station apparatus 3 in the case where a transmission of a first reference signal (A-SRS) and a transmission of a second reference signal (P-SRS) have happened to coincide in the same timing in a basic configuration of the fourth embodiment of the present invention. The mobile station apparatus 3 determines whether or not a transmission of a first reference signal and a transmission of a second reference signal have happened to coincide in the same timing (Step S500). In the case where a first reference signal and a second reference signal have happened to coincide in the same timing (Step S500: YES), the mobile station apparatus 3 determines whether or not information that a simultaneous transmission by a plurality of uplink channels is allowed is included in simultaneous transmission control information transmitted from the base station apparatus 1 (Step S501). In the case where information allowing a simultaneous transmission by a plurality of uplink channels is included in the downlink signal (Step S501: YES), the mobile station apparatus 3 determines whether or not a first reference signal and a second reference signal have been allocated by using the same radio resources (Step S502).

In the case where a first reference signal and a second reference signal have been allocated by using the same radio resources (Step S502: YES), the mobile station apparatus 3 transmits a first reference signal without transmitting (dropping) a second reference signal (Step S503). In the case where information that a simultaneous transmission by a plurality of uplink channels is not allowed is included in simultaneous transmission control information (Step S501: NO), the mobile station apparatus 3 transmits a first reference signal without transmitting a second reference signal (Step S503). In the case where a first reference signal and a second reference signal have been allocated by using different radio resources (Step S502: NO), the mobile station apparatus 3 transmits a first reference signal and a second reference signal simultaneously (Step S504). In the case where a transmission of a first reference signal and a transmission of a second reference signal have not happened to coincide in the same timing (Step S500: NO), the mobile station apparatus 3 transmits a first reference signal and a second reference signal in each timing to the base station apparatus 1 (Step S505). However, as exception processing, in the case where the sum total transmit power of a first reference signal and a physical uplink control channel which have happened to coincide in the same timing exceeds the maximum transmit power of the mobile station apparatus 3, the mobile station apparatus 3, even if a simultaneous transmission by a plurality of uplink channels is allowed, transmits a first reference signal without transmitting a second reference signal.

[First Modification Example of Fourth Embodiment]

Then, a first modification example of the fourth embodiment of the present invention will be described. In the first modification example of the fourth embodiment, the base station apparatus 1 transmits a signal including information allowing a simultaneous transmission by a plurality of uplink channels to the mobile station apparatus 3. The mobile station apparatus 3, in accordance with the information allowing a simultaneous transmission by a plurality of uplink channels, can perform simultaneously transmission of a first reference signal and transmission on a physical uplink control channel in the case where a transmission of the first reference signal and a transmission on the physical uplink control channel have happened to coincide in the same timing.

Since function configurations of apparatuses in the first modification example of the fourth embodiment are the same as those of what have been shown in the first embodiment, descriptions thereof are omitted here. There is shown a processing procedure of a transmission control of the mobile station apparatus 3 in the case where the base station apparatus 1 allows the mobile station apparatus 3 to perform simultaneous transmission by a plurality of uplink channels.

Figure 7:
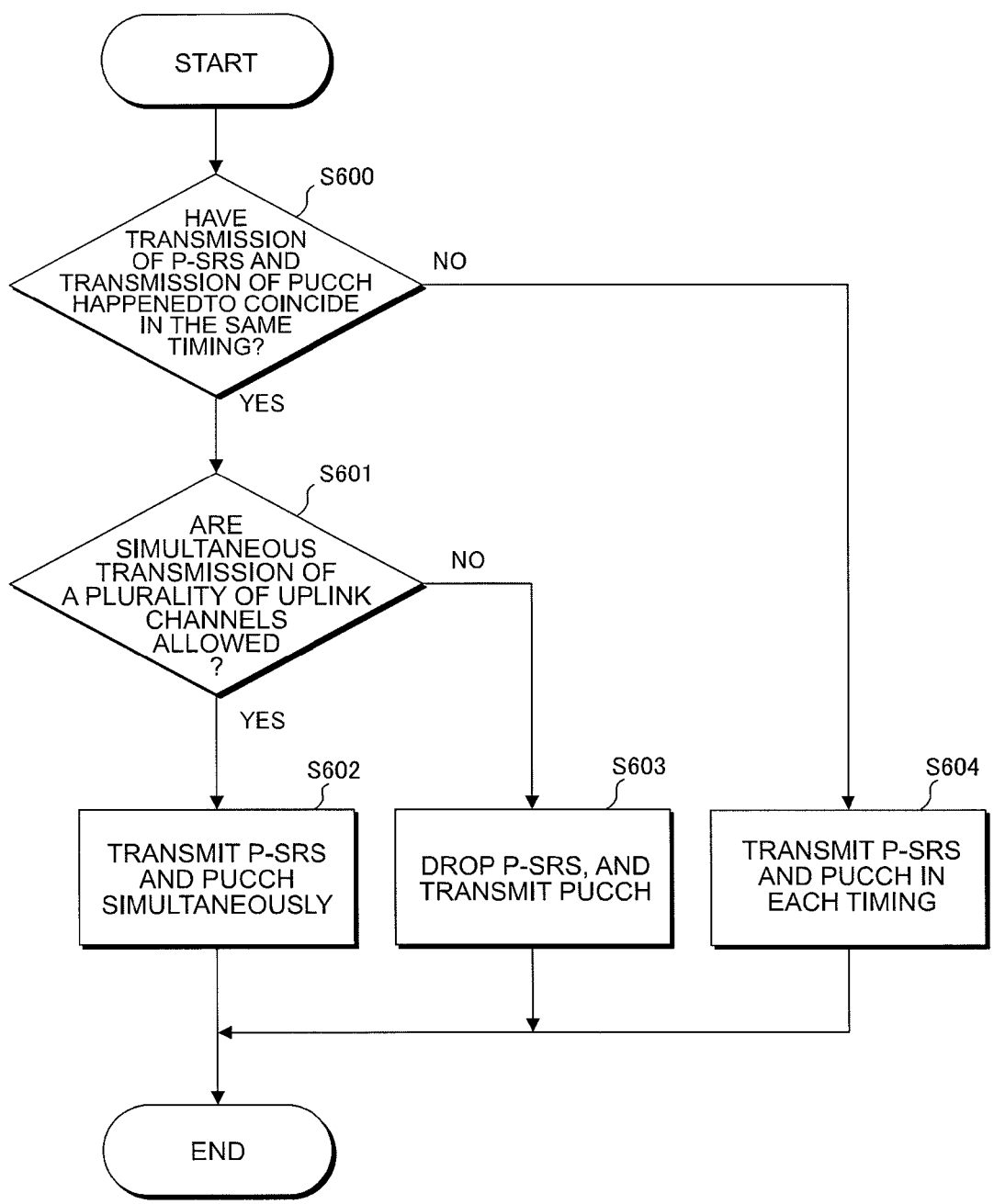
FIG. 7 is a flow chart showing a processing procedure of a transmission control of the mobile station apparatus 3 in the case where a transmission of the first reference signal (A-SRS) and a transmission on the physical uplink control channel (PUCCH) have happened to coincide in the same timing in a first modification example of the fourth embodiment of the present invention.

FIG. 7 is a flow chart showing a processing procedure of a transmission control of the mobile station apparatus 3 in the case where a transmission of a first reference signal (A-SRS) and a transmission on a physical uplink control channel (PUCCH) have happened to coincide in the same timing in the first modification example of the fourth embodiment of the present invention. The mobile station apparatus 3 determines whether or not a transmission of a first reference signal and a transmission on a physical uplink control channel have happened to coincide in the same timing (Step S600). In the case where a transmission of a first reference signal and a transmission on a physical uplink control channel have happened to coincide in the same timing (Step S600: YES), the mobile station apparatus 3 determines whether or not information allowing a simultaneous transmission by a plurality of uplink channels is included in simultaneous transmission control information transmitted from the base station apparatus 1 (Step S601). In the case where the information allowing a simultaneous transmission by a plurality of uplink channels is included in the downlink signal (Step S601: YES), the mobile station apparatus 3 transmits simultaneously a first reference signal and a physical uplink control channel (Step S602). In the case where the information that a simultaneous transmission by a plurality of channels is not allowed is included in simultaneous transmission control information (Step S601: NO), the mobile station apparatus 3 transmits a physical uplink control channel without transmitting a first reference signal (Step S603).

In the case where a transmission of a first reference signal and a transmission on a physical uplink control channel have not happened to coincide in the same timing (Step S600: NO), the mobile station apparatus 3 transmits a first reference signal and a physical uplink control channel in each timing (Step S604). However, as exception processing, in the case where the sum total transmit power of a first reference signal and a physical uplink control channel which have happened to coincide in the same timing exceeds the maximum transmit power of the mobile station apparatus 3, the mobile station apparatus 3, even if a simultaneous transmission by a plurality of uplink channels is allowed, transmits a physical uplink control channel without transmitting a first reference signal.

<Second Modification Example of Fourth Embodiment>

Next, a second modification example of the fourth embodiment of the present invention will be described. In the second modification example of the fourth embodiment, the base station apparatus 1 transmits a signal including information allowing a simultaneous transmission by a plurality of uplink channels to the mobile station apparatus 3. The mobile station apparatus 3, in accordance with the information allowing a simultaneous transmission by a plurality of uplink channels, can perform transmission of a first reference signal and transmission on a physical uplink control channel simultaneously in the case where a transmission of a first reference signal, a transmission of a second reference signal and a transmission on a physical uplink control channel have happened to coincide in the same timing.

Since function structures of apparatuses in the fourth embodiment are the same as those of what have been shown in the first embodiment, descriptions thereof are omitted here. In the fourth embodiment, there is shown a processing procedure of a transmission control of the mobile station apparatus 3 in the case where the base station apparatus 1 allows the mobile station apparatus 3 to perform simultaneous transmission by a plurality of uplink channels. As a simultaneous transmission of a plurality of uplink channels, there are a simultaneous transmission of a plurality of PUSCHs, a simultaneous transmission of a plurality of PUCCHs, and a simultaneous transmission of the PUSCH and PUCCH, etc.

Figure 8:
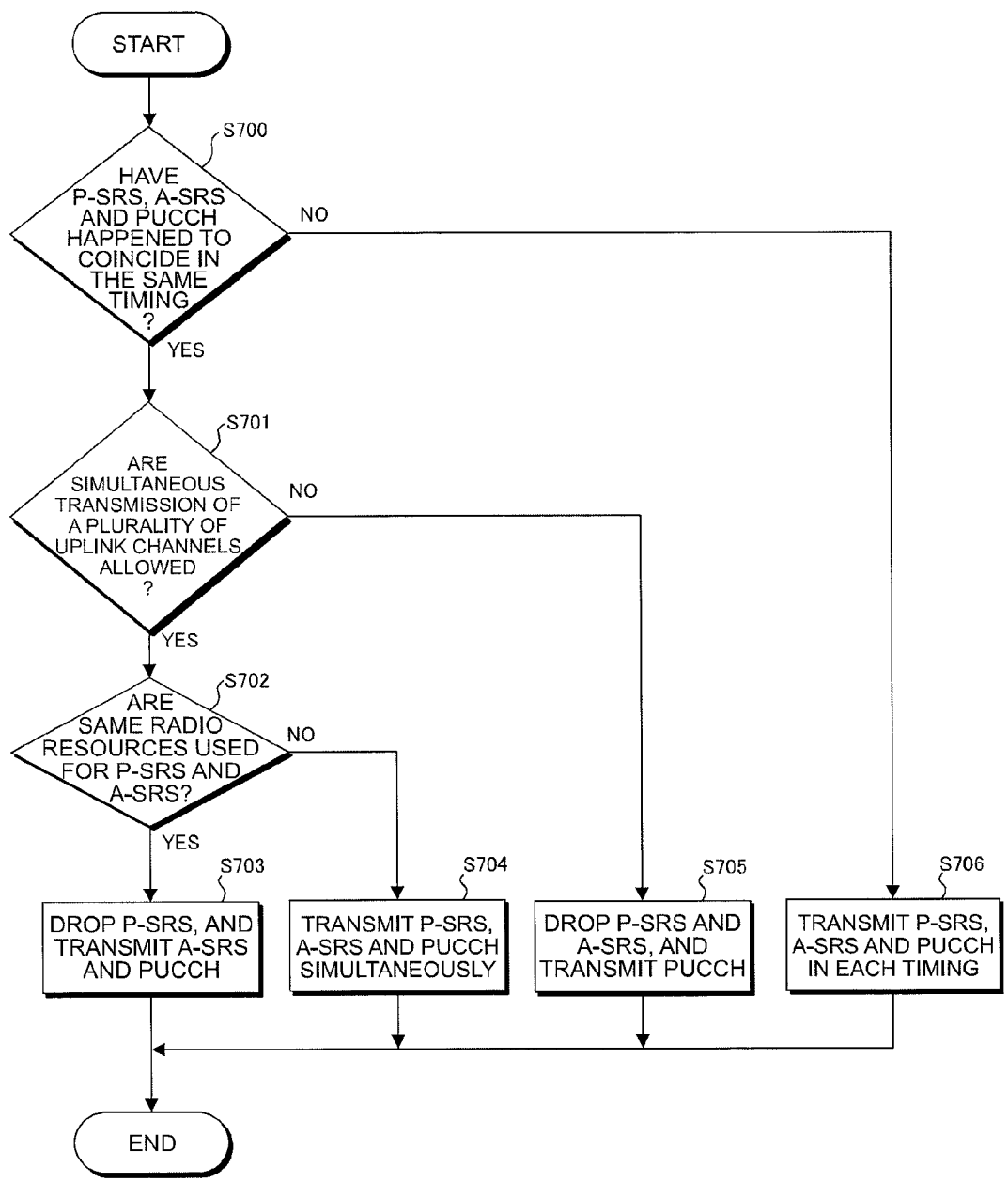
FIG. 8 is a flow chart showing a processing procedure of a transmission control of the mobile station apparatus 3 in the case where a transmission of the first reference signal (A-SRS), a transmission of the second reference signal (P-SRS) and a transmission on the Physical Uplink Control Channel (PUCCH) have happened to coincide in the same timing in a second modification example of the fourth embodiment of the present invention.

FIG. 8 is a flow chart showing a processing procedure of a transmission control of the mobile station apparatus 3 in the case where a transmission of a first reference signal (A-SRS), a transmission of a second reference signal (P-SRS) and a transmission on a Physical Uplink Control Channel (PUCCH) have happened to coincide in the same timing in the second modification example of the fourth embodiment of the present invention. The mobile station apparatus 3 determines whether or not a transmission of a first reference signal, a transmission of a second reference signal and a transmission on a physical uplink control channel have happened to coincide in the same timing (Step S700). In the case where a transmission of a first reference signal, a transmission of a second reference signal and a transmission on a physical uplink control channel have happened to coincide in the same timing (Step S700: YES), the mobile station apparatus 3 determines whether or not information allowing a simultaneous transmission of a plurality of uplink channels is included in a downlink signal transmitted from the base station apparatus 1 (Step S701). In the case where the information allowing a simultaneous transmission by a plurality of uplink channels is included in the downlink signal (Step S701: YES), the mobile station apparatus 3 determines whether or not a first reference signal and a second reference signal have been allocated by using the same radio resources (Step S702).

In the case where a first reference signal and a second reference signal have been allocated by using the same radio resources (Step S702: YES), the mobile station apparatus 3 transmits a first reference signal and a physical uplink control channel, without transmitting (dropping) a second reference signal (Step S703). In the case where a first reference signal and a second reference signal are allocated by using different radio resources (Step S702: NO), the mobile station apparatus 3 transmits simultaneously a first reference signal, a second reference signal and a physical uplink control channel (Step S704).

In the case where the information that a simultaneous transmission by a plurality of uplink channels is not allowed is included in the simultaneous transmission control information (Step S701: NO), the mobile station apparatus 3 transmits a physical uplink control channel without transmitting (dropping) a first reference signal and a second reference signal (Step S705). In the case where a transmission of a first reference signal, a transmission of a second reference signal and a transmission on a physical uplink control channel have not happened to coincide in the same timing (Step S700: NO), the mobile station apparatus 3 transmits a first reference signal, a second reference signal and a physical uplink control channel in each timing (Step S706). However, as exception processing, in the case where the sum total transmit power of a first reference signal, a second reference signal and a physical uplink control channel which have happened to coincide in the same timing exceeds the maximum transmit power of the mobile station apparatus, the mobile station apparatus 3, even if a simultaneous transmission by a plurality of uplink channels is allowed, transmits a physical uplink control channel without transmitting a first reference signal and a second reference signal.

By the fact that the base station apparatus 1 sets whether or not to allow a simultaneous transmission by a plurality of uplink channels, the mobile station apparatus 3 can determine processing in the case where a transmission of reference signal for channel estimation and a transmission on a physical uplink control channel have happened to coincide in the same timing.

FIG. 9 is a figure showing an example of a transmission timing of a first reference signal (A-SRS), a second reference signal (P-SRS) and a Physical Uplink Control Channel (PUCCH) in the fourth embodiment of the present invention. In the case where a transmission of a first reference signal, a transmission of a second reference signal and a transmission on a physical uplink control channel have happened to coincide in the same timing like sub-frame #8, if a transmission of a first reference signal, a transmission of a second reference signal and a transmission on a physical uplink control channel have happened to coincide each in different component carriers, the mobile station apparatus 3 performs simultaneously transmission of a first reference signal, transmission of a second reference signal and transmission on a physical uplink control channel. In the case where a transmission of a first reference signal, a transmission of a second reference signal and a transmission on a physical uplink control channel have happened to coincide in the same component carrier, if the mobile station apparatus 3 transmits simultaneously a first reference signal, a second reference signal and a physical uplink control channel, these communication qualities deteriorates. In the fourth embodiment of the present invention, the mobile station apparatus 3, in order to suppress an increase of a PAPR due to a multi-carrier transmission, transmits a physical uplink control channel without transmitting a first reference signal and a second reference signal. That is, the mobile station apparatus 3 transmits a physical control channel dropping a first reference signal and a second reference signal.

In the case where a transmission of any two signals among a transmission of a first reference signal, a transmission of a second reference signal and a transmission on a physical uplink control channel have happened to coincide in the same timing like sub-frame #3, #6 and #18, the mobile station apparatus 3 performs transmission of each signal simultaneously if a transmission of each signal has happened to coincide in a different component carrier, and if a transmission of each signal has happened to coincide in the same component carrier, the mobile station apparatus 3 does not transmit (drops) a first reference signal in the case of the sub-frame #3, a second reference signal in the case of the sub-frame #6, and a second reference signal in the case of the sub-frame #18. That is, the mobile station apparatus 3 transmits, to the base station apparatus 1, a signal having a high priority.

In addition, in the case where only a transmission of any one uplink signal among a transmission of a first reference signal, a transmission of a second reference signal and a transmission on a physical uplink control channel have happened to coincide like the sub-frame #0, #2, #4, #10, #12, #13, #14, #15, and #16, the mobile station apparatus 3, no matter which component carrier each signal will have been allocated to, can transmit each signal in each transmission timing. However, in the case where information allowing a simultaneous transmission by a plurality of uplink channels is transmitted from the base station apparatus 1, if a first reference signal and a second reference signal have not been allocated by using the same radio resources, the mobile station apparatus 3 can carry out simultaneous transmission even if each signal happens to coincide in the same timing.

In this way, in the fourth embodiment, by the fact that information allowing a simultaneous transmission by a plurality of uplink channels is set from the base station apparatus 1, even in the case where a transmission of a first reference signal for channel estimation, a transmission of a second reference signal and a transmission on a physical uplink control channel have happened to coincide in the same timing, the mobile station apparatus 3 can perform transmission simultaneously. According to the present invention, the mobile station apparatus 3 can perform transmission of a reference signal for channel estimation and transmission on a physical uplink control channel efficiently in a short time. Meanwhile, in the first to fourth embodiments, uplink control information transmitted by a PUCCH may be transmitted while including a SR, ACK/NACK, and a CQI.

Meanwhile, a part of functions of the base station apparatus 1 and the mobile station apparatus 3 in embodiments mentioned above may be made to be realized by a computer. In that case, the functions may be realized by the fact that a program for realizing this control function is recorded on a computer-readable recording medium, and the program recorded on this recording medium is caused to be read into a computer system and executed. Meanwhile, the "computer system" mentioned here is assumed to include an OS and hardware such as a peripheral device.

Furthermore, the "computer-readable recording medium" means portable media such as a flexible disk, a magnetic-optical disk, a ROM and a CD-ROM, and storage devices such as a hard disk built-in in a computer system. Moreover, the "computer-readable recording medium" may also include one which holds a program dynamically in a short time like a communication line in the case of transmitting a program via a network such as the Internet or a communication channel such as a telephone line, and one which holds a program in a certain period of time like a volatile memory inside a computer system used as a server or a client in that case. The above-mentioned program may be one for realizing a part of functions mentioned above, and furthermore, may be one which can realize functions mentioned above in combination with a program already recorded in a computer system.

A part or all of the mobile station apparatus 3 and the base station apparatus 1 in the embodiments mentioned above, may be realized as a LSI which is an integrated circuit typically. Each functional block of the mobile station apparatus 3 and the base station apparatus 1 may be formed into a chip individually, and a part or all may be formed into a chip. A method of making a integrated circuit may be realized not only by a LSI but by a dedicated circuit, or a general-purpose processor. In the case where a technology of making an integrated circuit, which is substituted for a LSI, appears because of a progress of a semiconductor technology, it is also possible to use an integrated circuit on the basis of the technology.

As mentioned above, embodiments of this invention has been described in details with reference to drawings, and specific configurations are not limited to the embodiments, and a design etc. within a scope not departing from the gist of this invention are included in Claims.

INDUSTRIAL APPLICABILITY

DESCRIPTION OF SYMBOLS

1 Base station apparatus
3 Mobile station apparatus
101 Transmission section
103 Reception section
105 Scheduling section
107 Higher layer
109 Antenna
201 Transmission section
203 Reception section
205 Scheduling section
206 Reference signal generation part
207 Higher layer
209 Antenna
1011 Data control part
1013 Modulation part
1015 Radio transmission part
1031 Radio reception part
1033 Demodulation part
1035 Data extraction part
1071 Radio resource control part
2011 Data control part
2013 Modulation part
2015 Radio transmission part
2031 Radio reception part
2033 Demodulation part
2035 Data extraction part
2051 Reference signal control part
2071 Radio resource control part

The invention claimed is:

1. A mobile station apparatus comprising;
a receiving circuitry configured to and/or programmed to receive first information by using a radio resource control signal; and
a transmitting circuitry configured to and/or programmed to drop a transmission of a sounding reference signal,
in a case that the first information is provided,
in a case that the transmission of the sounding reference signal for a first component carrier overlaps with a transmission of a physical uplink control channel for a second component carrier, and
in a case that total transmit power of the mobile station apparatus exceeds total maximum output power configured by the mobile station apparatus, on an overlapped portion of a symbol in which the transmission of the sounding reference signal for the first component carrier overlaps with the transmission of the physical uplink control channel for the second component carrier.

2. The mobile station apparatus according to claim 1, wherein
the total transmit power includes at least transmit power of the sounding reference signal and transmit power of the physical uplink control channel.

3. The mobile station apparatus according to claim 1, wherein
the transmitting circuitry is configured to and/or programmed to drop transmission of the sounding reference signal,
in a case that the first information and second information are provided,
in a case that the transmission of the sounding reference signal for the first component carrier overlaps with the transmission of the physical uplink control channel for the second component carrier and with a transmission of a physical uplink control channel for a third component carrier, and
in a case that total transmit power of the mobile station apparatus exceeds total maximum output power configured by the mobile station apparatus, on an overlapped portion of a symbol in which the transmission of the sounding reference signal for the first component carrier overlaps with the transmission of the physical uplink control channel for the second component carrier and with the transmission of the physical uplink control channel for the third component carrier.

4. The mobile station apparatus according to claim 1, wherein
the transmitting circuitry is configured to and/or programmed to drop transmission of the sounding reference signal,
in the case that the first information is provided,
in a case that the transmission of the sounding reference signal for the first component carrier overlaps with the transmission of the physical uplink control channel for the second component carrier and with a transmission of a sounding reference signal for a third component carrier, and
in a case that total transmit power of the mobile station apparatus exceeds total maximum output power configured by the mobile station apparatus, on an overlapped portion of a symbol in which the transmission of the sounding reference signal for the first component carrier overlaps with the transmission of the physical uplink control channel for the second component carrier and with the transmission of the sounding reference signal for the third component carrier.

5. The mobile station apparatus according to claim 1, wherein
the receiving circuitry is configured to and/or programmed to receive on a physical downlink control channel from the base station apparatus, information for requesting the mobile station apparatus to transmit the sounding reference signal.

6. A communication method used in a mobile station apparatus, the communication method comprising;

receiving first information by using a radio resource control signal; and dropping a transmission of a sounding reference signal,
- in a case that the first information is provided,
  - in a case that the transmission of the sounding reference signal for a first component carrier overlaps with a transmission of a physical uplink control channel for a second component carrier, and
  - in a case that total transmit power of the mobile station apparatus exceeds total maximum output power configured by the mobile station apparatus, on an overlapped portion of a symbol in which the transmission of the sounding reference signal for the first component carrier overlaps with the transmission of the physical uplink control channel for the second component carrier.

7. The communication method according to claim 6, wherein
the total transmit power includes at least transmit power of the sounding reference signal and transmit power of the physical uplink control channel.

8. The communication method according to claim 6, further comprising:
dropping transmission of the sounding reference signal,
- in a case that the first information and second information are provided,
  - in a case that the transmission of the sounding reference signal for the first component carrier overlaps with the transmission of the physical uplink control channel for the second component carrier and with a transmission of a physical uplink control channel for a third component carrier, and
  - in a case that total transmit power of the mobile station apparatus exceeds total maximum output power configured by the mobile station apparatus, on an overlapped portion of a symbol in which the transmission of the sounding reference signal for the first component carrier overlaps with the transmission of the physical uplink control channel for the second component carrier and with the transmission of the physical uplink control for the third component carrier.

9. The communication method according to claim 6, further comprising:
dropping transmission of the sounding reference signal,
- in the case that the first information is provided,
  - in a case that the transmission of the sounding reference signal for the first component carrier overlaps with the transmission of the physical uplink control channel for the second component carrier and with a transmission of a sounding reference signal for a third component carrier, and
  - in a case that total transmit power of the mobile station apparatus exceeds total maximum output power configured by the mobile station apparatus, on an overlapped portion of a symbol in which the transmission of the sounding reference signal for the first component carrier overlaps with the transmission of the physical uplink control channel for the second component carrier and with the transmission of the sounding reference signal for the third component carrier.

10. The communication method according to claim 6, further comprising:
receiving on a physical downlink control channel from the base station apparatus, information for requesting the mobile station apparatus to transmit the sounding reference signal.

* * * * *